(12) United States Patent
Hagiwara et al.

(10) Patent No.: US 9,617,900 B2
(45) Date of Patent: Apr. 11, 2017

(54) DETERIORATION DIAGNOSIS DEVICE FOR AN EXHAUST GAS PURIFICATION APPARATUS

(71) Applicant: TOYOTA JIDOSHA KABUSHIKI KAISHA, Toyota-shi, Aichi-ken (JP)

(72) Inventors: Koji Hagiwara, Susono (JP); Hirotaka Saitoh, Shizuoka-ken (JP); Yasushi Iwazaki, Ebina (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 15/018,601

(22) Filed: Feb. 8, 2016

(65) Prior Publication Data
US 2016/0237875 A1    Aug. 18, 2016

(30) Foreign Application Priority Data
Feb. 13, 2015  (JP) ................................ 2015-027003

(51) Int. Cl.
*F01N 3/00* (2006.01)
*F01N 11/00* (2006.01)
(Continued)

(52) U.S. Cl.
CPC ........ *F01N 11/007* (2013.01); *B01D 53/9477* (2013.01); *B01D 53/9495* (2013.01);
(Continued)

(58) Field of Classification Search
USPC .................. 60/274, 276, 277, 285, 286, 297
See application file for complete search history.

(56) References Cited

U.S. PATENT DOCUMENTS 7,918,086 B2*  4/2011  Surnilla ................ F01N 3/0807
                                                    60/274
8,186,149 B2*  5/2012  Satoh ................. B01D 53/9422
                                                    60/274
(Continued)

FOREIGN PATENT DOCUMENTS

JP    2008-128213 B2    5/2008
JP    2012-241652 A    12/2012
(Continued)

*Primary Examiner* — Binh Q Tran
(74) *Attorney, Agent, or Firm* — Andrews Kurth Kenyon LLP

(57) ABSTRACT

A deterioration diagnosis device for an exhaust gas purification apparatus which performs inducement processing when the internal combustion engine is operated at a lean air fuel ratio, measures, by means of air fuel ratio sensors, the air fuel ratio of exhaust gas flowing into the SCR catalyst and the air fuel ratio of exhaust gas flowing out from the SCR catalyst during a period while the inducement processing is performed, and diagnoses deterioration of the SCR catalyst based on a difference between the measured values of these sensors, wherein an amount of hydrogen produced by each of a three-way catalyst and an NSR catalyst is estimated based on the deterioration degree thereof, and an air fuel ratio of exhaust gas discharged from the internal combustion engine is feedback-controlled so that the air fuel ratio of the exhaust gas flowing into one of the three-way catalyst and the NSR catalyst in which the hydrogen production amount thus estimated is larger than that in the other becomes a target value.

3 Claims, 8 Drawing Sheets

(51) Int. Cl.
*F01N 3/08* (2006.01)
*F01N 3/10* (2006.01)
*F01N 3/20* (2006.01)
*F02D 41/02* (2006.01)
*F01N 13/00* (2010.01)
*B01D 53/94* (2006.01)
*F02D 41/14* (2006.01)

(52) U.S. Cl.
CPC ........... *F01N 3/0807* (2013.01); *F01N 3/101* (2013.01); *F01N 3/2066* (2013.01); *F01N 3/2073* (2013.01); *F01N 11/00* (2013.01); *F01N 13/009* (2014.06); *F02D 41/0235* (2013.01); *F02D 41/0295* (2013.01); *F02D 41/1441* (2013.01); *F02D 41/1456* (2013.01); *F01N 2430/06* (2013.01); *F01N 2550/02* (2013.01); *F01N 2560/025* (2013.01); *F01N 2560/14* (2013.01); *F01N 2610/02* (2013.01); *F01N 2900/0408* (2013.01); *F01N 2900/0412* (2013.01); *F01N 2900/0418* (2013.01); *F01N 2900/1402* (2013.01); *F01N 2900/1624* (2013.01); *F02D 2041/147* (2013.01); *F02D 2200/0816* (2013.01)

(56) References Cited

U.S. PATENT DOCUMENTS

| | | | |
|---|---|---|---|
| 8,904,756 B2 * | 12/2014 | Yoda | F01N 3/0814 60/277 |
| 2010/0078000 A1 * | 4/2010 | Sakamoto | F01N 3/10 123/672 |
| 2010/0242934 A1 * | 9/2010 | Yonekawa | F02D 41/0295 123/672 |
| 2013/0340408 A1 * | 12/2013 | Narayanaswamy | F01N 3/106 60/274 |

FOREIGN PATENT DOCUMENTS

| | | |
|---|---|---|
| JP | 2016-008510 A | 1/2016 |
| WO | 2015/194155 A1 | 12/2015 |

* cited by examiner

DETERIORATION DIAGNOSIS DEVICE FOR AN EXHAUST GAS PURIFICATION APPARATUS

TECHNICAL FIELD

The present invention relates to a technology for diagnosing deterioration of an exhaust gas purification apparatus disposed in an exhaust passage of an internal combustion engine, and in particular to a technology for diagnosing deterioration of the exhaust gas purification apparatus equipped with a selective catalytic reduction (SCR) catalyst.

BACKGROUND ART

As a method of diagnosing deterioration of an exhaust gas purification apparatus disposed in an exhaust passage of an internal combustion engine, there has been known a method of using measured values of air fuel ratio sensors or oxygen concentration sensors which are disposed in a portion of the exhaust passage at the upstream side of the exhaust gas purification apparatus and in a portion of the exhaust passage at the downstream side of the exhaust gas purification apparatus, respectively. Specifically, there has been known a technology in which an amount of oxygen ($O_2$), which can be stored by the exhaust gas purification apparatus (hereinafter, referred to as an "oxygen storage capacity"), is obtained from a difference between outputs of the above-mentioned sensors disposed at two locations (hereinafter, referred to as a "sensor output difference") at the time of changing the air fuel ratio of the exhaust gas flowing into the exhaust gas purification apparatus from a lean air fuel ratio higher than a stoichiometric air fuel ratio into a rich air fuel ratio lower than the stoichiometric air fuel ratio, and the deterioration of the exhaust gas purification apparatus is diagnosed based on the oxygen storage capacity thus obtained (see, for example, patent literature 1). Further, in patent literature 2, there is disclosed a technology in which in an exhaust gas purification apparatus provided with a three-way catalyst and a lean NOx catalyst, the amount of a reducing agent to be supplied to the lean NOx catalyst is adjusted according to the deterioration degree of the three-way catalyst.

CITATION LIST

Patent Literature 1: Japanese Patent Application Publication No. 2012-241652
Patent Literature 2: Japanese Patent Application Publication No. 2008-128213

SUMMARY OF INVENTION

Technical Problem

Although the above-mentioned conventional technologies are aimed at an exhaust gas purification apparatus equipped with a three-way catalyst, but an SCR catalyst also has an oxygen storage ability, similar to the three-way catalyst, so it can be considered that deterioration of the SCR catalyst is diagnosed by the same method as in the above-mentioned conventional technologies. However, the oxygen storage capacity of the SCR catalyst is smaller than the oxygen storage capacity of the three-way catalyst, and hence, even in cases where the SCR catalyst is in a normal state where it has not deteriorated, a sensor output difference becomes small. For that reason, when an error is included in a measured value of at least one of the sensors for measuring the air fuel ratio of exhaust gas, the oxygen storage capacity of the SCR catalyst can not be obtained from the sensor output difference in an accurate manner, so that diagnostic accuracy may drop.

In contrast to this, there can be considered a method in which a three-way catalyst and a storage reduction catalyst (NSR (NOx Storage Reduction) catalyst) are disposed in an exhaust passage at the upstream side of an SCR catalyst, wherein a difference between a sensor output difference at the time when the SCR catalyst is normal and a sensor output difference at the time when the SCR catalyst has deteriorated is made to enlarge, by inducing a water gas shift reaction in the three-way catalyst or the NSR catalyst at the time when the air fuel ratio of exhaust gas is changed from a lean air fuel ratio into a rich air fuel ratio.

However, when the air fuel ratio of the exhaust gas flowing into the three-way catalyst or the NSR catalyst varies at the time of inducing the water gas shift reaction in the three-way catalyst or the NSR catalyst, the amount of hydrogen produced by the three-way catalyst or the NSR catalyst may vary. In addition, the amount of hydrogen produced by the three-way catalyst or the NSR catalyst may also vary according to the deterioration degree of each of these catalysts, too. When the amount of hydrogen produced by the three-way catalyst or the NSR catalyst varies, the amount of hydrogen flowing into the SCR catalyst also varies, so that it may become difficult to diagnose deterioration of the SCR catalyst with a high degree of accuracy.

Solution to Problem

The present invention has been made in view of the actual circumstances as referred to above, and the object of the present invention is to provide a technology in which deterioration of an SCR catalyst can be diagnosed with sufficient accuracy by making use of a sensor for measuring an air fuel ratio of exhaust gas flowing into an exhaust gas purification apparatus equipped with the SCR catalyst, and a sensor for measuring an air fuel ratio of exhaust gas flowing out from the exhaust gas purification apparatus.

In order to solve the above-mentioned problems, the present invention resides in a deterioration diagnosis device for an exhaust gas purification apparatus in which at the time when an air fuel ratio of exhaust gas discharged from an internal combustion engine is a lean air fuel ratio, inducement processing is carried out which is to induce a water gas shift reaction in each of a three-way catalyst and an NSR catalyst by changing to a predetermined rich air fuel ratio lower than a stoichiometric air fuel ratio an air fuel ratio of exhaust gas flowing into each of the three-way catalyst and the NSR catalyst arranged at the upstream side of the SCR catalyst, and an air fuel ratio of exhaust gas flowing into the SCR catalyst and an air fuel ratio of exhaust gas flowing out of the SCR catalyst during a period of time of the execution of the inducement processing are measured by means of air fuel ratio sensors, respectively, so that deterioration of the SCR catalyst is diagnosed based on a difference between the measured values of these sensors, wherein an amount of hydrogen produced by each of the three-way catalyst and the NSR catalyst is estimated based on a deterioration degree thereof, and the air fuel ratio of exhaust gas discharged from the internal combustion engine is controlled so that the air fuel ratio of the exhaust gas flowing into one of the three-way catalyst and the NSR catalyst in which the hydrogen production amount thus estimated is larger than that in the other becomes a target value.

Specifically, the present invention resides in a deterioration diagnosis device for an exhaust gas purification apparatus which comprises: a first exhaust gas purification unit that is arranged in an exhaust passage of an internal combustion engine capable of a lean burn operation, and is equipped with a three-way catalyst which serves to promote a water gas shift reaction when an air fuel ratio of exhaust gas is a rich air fuel ratio which is lower than a stoichiometric air fuel ratio; a second exhaust gas purification unit that is arranged in the exhaust passage at the downstream side of the first exhaust gas purification unit, and is equipped with a storage reduction catalyst which serves to promote a water gas shift reaction when the air fuel ratio of exhaust gas is a rich air fuel ratio which is lower than the stoichiometric air fuel ratio; a third exhaust gas purification unit that is arranged in the exhaust passage at the downstream side of the second exhaust gas purification unit, and is equipped with a selective catalytic reduction catalyst which serves to store oxygen in exhaust gas when the air fuel ratio of the exhaust gas is a lean air fuel ratio higher than the stoichiometric air fuel ratio, and to desorb the oxygen thus stored when the air fuel ratio of the exhaust gas is equal to or lower than the stoichiometric air fuel ratio; a first air fuel ratio sensor that measures a physical quantity correlated with an air fuel ratio of exhaust gas flowing into the first exhaust gas purification unit; a second air fuel ratio sensor that measures a physical quantity correlated with an air fuel ratio of exhaust gas flowing into the second exhaust gas purification unit; a third air fuel ratio sensor that measures a physical quantity correlated with an air fuel ratio of exhaust gas flowing into the third exhaust gas purification unit; a fourth air fuel ratio sensor that measures a physical quantity correlated with an air fuel ratio of exhaust gas flowing out from the third exhaust gas purification unit; and a controller, comprising at least one processor, configured to: perform, when the air fuel ratio of the exhaust gas discharged from the internal combustion engine is a lean air fuel ratio, inducement processing of inducing a water gas shift reaction in each of the first exhaust gas purification unit and the second exhaust gas purification unit, by changing an air fuel ratio of exhaust gas discharged from the internal combustion engine to a rich air fuel ratio lower than the stoichiometric air fuel ratio; obtain a total sensor output difference which is a total sum of a sensor output difference in a period while the inducement processing is performed, by integrating the sensor output difference which is a difference between a measured value of the third air fuel ratio sensor and a measured value of the fourth air fuel ratio sensor in the period, and diagnose deterioration of the third exhaust gas purification unit by using the total sensor output difference as a parameter; and estimate, based on a deterioration degree of the three-way catalyst and a deterioration degree of the storage reduction catalyst, a first hydrogen production amount which is an amount of hydrogen produced by the first exhaust gas purification unit and a second hydrogen production amount which is an amount of hydrogen produced by the second exhaust gas purification unit while the inducement processing is performed; wherein the controller is further configured so as to perform the inducement processing by controlling the air fuel ratio of the exhaust gas discharged from the internal combustion engine in such a manner that in cases where the first hydrogen production amount is more than the second hydrogen production amount, a measured value of the first air fuel ratio sensor becomes a first predetermined rich air fuel ratio, and in cases where the second hydrogen production amount is more than the first hydrogen production amount, a measured value of the second air fuel ratio sensor becomes a second predetermined rich air fuel ratio.

When the air fuel ratio of the exhaust gas discharged from the internal combustion engine is a lean air fuel ratio, the air fuel ratio of the exhaust gas flowing into the third exhaust gas purification unit becomes a lean air fuel ratio. In that case, the oxygen contained in the exhaust gas is stored in the selective catalytic reduction catalyst (SCR catalyst) of the third exhaust gas purification unit. When the air fuel ratios of the exhaust gases flowing into the first exhaust gas purification unit and the second exhaust gas purification unit are each changed from a lean air fuel ratio to a rich air fuel ratio by the inducement processing being carried out in such a state, the air fuel ratio of the exhaust gas flowing into the third exhaust gas purification unit will also change from a lean air fuel ratio to a rich air fuel ratio. As a result, the oxygen stored in the SCR catalyst desorbs from the SCR catalyst.

The oxygen desorbed from the SCR catalyst flows out of the third exhaust gas purification unit together with the exhaust gas. For that reason, the air fuel ratio of the exhaust gas flowing out of the third exhaust gas purification unit becomes higher than the air fuel ratio of the exhaust gas flowing into the third exhaust gas purification unit. As a result, there occurs a difference between the measured value of the third air fuel ratio sensor and the measured value of the fourth air fuel ratio sensor, resulting from the amount of the oxygen desorbed from the SCR catalyst of the third exhaust gas purification unit.

In addition, when the air fuel ratio of the exhaust gas flowing into each of the first exhaust gas purification unit and the second exhaust gas purification unit has been made to be a rich air fuel ratio by means of the execution of the inducement processing, a water gas shift reaction occurs in each of the three-way catalyst of the first exhaust gas purification unit and the storage reduction catalyst (NSR catalyst) of the second exhaust gas purification unit. For that reason, in the first exhaust gas purification unit and the second exhaust gas purification unit, carbon monoxide (CO) and water ($H_2O$) in the exhaust gas react with each other to produce carbon dioxide ($CO_2$) and hydrogen. The hydrogen produced in the first exhaust gas purification unit and the second exhaust gas purification unit arrives at the third air fuel ratio sensor together with the exhaust gas. At that time, because the diffusion rate of the hydrogen is faster than that of any of the other exhaust gas components, the hydrogen precedently arrives at a sensor element of the third air fuel ratio sensor, thus putting the surrounding atmosphere of the sensor element into a rich atmosphere. As a result, the measured value of the third air fuel ratio sensor becomes lower than an actual air fuel ratio (rich shift). After that, when the hydrogen produced in the first exhaust gas purification unit and the second exhaust gas purification unit flows into the third exhaust gas purification unit, it will be oxidized by the SCR catalyst of the third exhaust gas purification unit, so that a rich shift of the fourth air fuel ratio sensor becomes smaller than that of the third air fuel ratio sensor. As a result, there also occurs a difference between the measured value of the third air fuel ratio sensor and the measured value of the fourth air fuel ratio sensor, resulting from the amount of the hydrogen oxidized by the SCR catalyst of the third exhaust gas purification unit.

Accordingly, the difference resulting from the amount of the oxygen desorbed from the SCR catalyst of the third exhaust gas purification unit, and the difference resulting from the amount of the hydrogen oxidized by the SCR catalyst are included in the difference between the measured value of the third air fuel ratio sensor and the measured value of the fourth air fuel ratio sensor in the state where the inducement processing has been performed.

Here, as the SCR catalyst deteriorates, the oxygen storage ability of the SCR catalyst also deteriorates accordingly, so that the oxygen storage capacity of the SCR catalyst becomes smaller. Accordingly, in the case where the SCR catalyst of the third exhaust gas purification unit has deteriorated, the amount of oxygen to desorb from the SCR catalyst of the third exhaust gas purification unit at the time of performing the inducement processing becomes smaller, in comparison with the case where the SCR catalyst has not deteriorated. As a result, the measured value of the fourth air fuel ratio sensor becomes closer to the measured value of the third air fuel ratio sensor.

Moreover, in the case where the SCR catalyst of the third exhaust gas purification unit has deteriorated, the amount of the hydrogen oxidized by the SCR catalyst becomes smaller, in comparison with the case where the SCR catalyst has not deteriorated. For that reason, in the case where the SCR catalyst of the third exhaust gas purification unit has deteriorated, the amount of the hydrogen arriving at the fourth air fuel ratio sensor at the time of performing the inducement processing becomes larger, in comparison with the case where the SCR catalyst has not deteriorated, so that the rich shift of the fourth air fuel ratio sensor accordingly becomes larger. As a result, the measured value of the fourth air fuel ratio sensor becomes closer to the measured value of the third air fuel ratio sensor.

Accordingly, in the case where the SCR catalyst of the third exhaust gas purification unit has not deteriorated, the difference between the measured value of the third air fuel ratio sensor and the measured value of the fourth air fuel ratio sensor becomes large due to the synergetic effect of the oxygen storage ability and the hydrogen oxidation ability of the SCR catalyst, but in contrast to this, in the case where the SCR catalyst of the third exhaust gas purification unit has deteriorated, the difference between the measured value of the third air fuel ratio sensor and the measured value of the fourth air fuel ratio sensor becomes small due to the synergetic effect of a decrease in the oxygen storage ability and a decrease in the hydrogen oxidation ability of the SCR catalyst. For that reason, an integrated value of the difference (a total sensor output difference) between the measured value of the third air fuel ratio sensor and the measured value of the fourth air fuel ratio sensor in a period of time from the start to the end of the inducement processing will differ greatly between the case where the SCR catalyst of the third exhaust gas purification unit has not deteriorated and the case where the SCR catalyst has deteriorated.

When a remarkable difference occurs in the total sensor output difference between the case where the SCR catalyst of the third exhaust gas purification unit has not deteriorated and the case where the SCR catalyst has deteriorated, even in cases where an error is included in the measured value of the third air fuel ratio sensor and/or the measured value of the fourth air fuel ratio sensor, the influence of the error becomes small, and hence, it becomes possible to carry out deterioration diagnosis of the third exhaust gas purification unit with sufficient accuracy. In addition, because existing sensors such as air fuel ratio sensors, oxygen concentration sensors, or the like can be used as the third air fuel ratio sensor and the fourth air fuel ratio sensor, the cost for the deterioration diagnosis device can also be decreased, in comparison with the case where NOx sensors, $NH_3$ sensors, etc., are used.

However, when the amount of the hydrogen flowing into the third exhaust gas purification unit at the time of performing the inducement processing varies, the total sensor output difference may also vary, and deterioration of the SCR catalyst may be unable to be diagnosed with a high degree of accuracy. The variation in the amount of the hydrogen flowing into the third exhaust gas purification unit at the time of performing the inducement processing results from the variation in the amount of the hydrogen produced in the first exhaust gas purification unit or in the second exhaust gas purification unit at the time of performing the inducement processing. Then, a main factor for the variation in the amount of the hydrogen produced in the first exhaust gas purification unit or in the second exhaust gas purification unit at the time of performing the inducement processing is considered to be the variation in the air fuel ratio of the exhaust gas flowing into the first exhaust gas purification unit or the second exhaust gas purification unit at the time of performing the inducement processing.

Accordingly, it is desirable to decrease the variation in the amount of the hydrogen flowing into the third exhaust gas purification unit at the time of performing the inducement processing, by controlling the air fuel ratio of the exhaust gas discharged from the internal combustion engine in a feedback manner so that the air fuel ratio of the exhaust gas flowing into the first exhaust gas purification unit or the second exhaust gas purification unit at the time of performing the inducement processing is converged to a desired rich air fuel ratio. Specifically, it is desirable to feedback-control the air fuel ratio of the exhaust gas discharged from the internal combustion engine in such a manner that the air fuel ratio of the exhaust gas flowing into one of the first exhaust gas purification unit and the second exhaust gas purification unit in which the hydrogen production amount is larger than that in the other becomes a desirable rich air fuel ratio suitable for producing hydrogen in that exhaust gas purification unit.

However, the amounts of hydrogen produced in the first exhaust gas purification unit and the second exhaust gas purification unit, respectively, at the time of performing the inducement processing change according to the degrees of deterioration of the three-way catalyst and the NSR catalyst, respectively. Accordingly, in the deterioration diagnosis device for an exhaust gas purification apparatus of the present invention, the amount of hydrogen produced in the first exhaust gas purification unit (the first hydrogen production amount), and the amount of hydrogen produced in the second exhaust gas purification unit (the second hydrogen production amount) at the time of performing the inducement processing are estimated, based on the deterioration degree of the three-way catalyst and the deterioration degree of the NSR catalyst, respectively. Then, in cases where the estimated first hydrogen production amount is more than the estimated second hydrogen production amount, the air fuel ratio of the exhaust gas discharged from the internal combustion engine is feedback-controlled so that the air fuel ratio of the exhaust gas flowing into the first exhaust gas purification unit (i.e., the measured value of the first air fuel ratio sensor) is made to be the first predetermined rich air fuel ratio, whereas in cases where the estimated second hydrogen production amount is more than the estimated first hydrogen production amount, the air fuel ratio of the exhaust gas discharged from the internal combustion engine is feedback-controlled so that the air fuel ratio of the exhaust gas flowing into the second exhaust gas purification unit (i.e., the measured value of the second air fuel ratio sensor) is made to be the second predetermined rich air fuel ratio. When the feedback control of the air fuel ratio of the exhaust gas discharged from the internal combustion engine is carried out by such a method at the time of performing the inducement processing, the variation in the air fuel ratio of the exhaust gas flowing into the one of the first exhaust gas purification unit and the second exhaust gas purification unit which is relatively large in the hydrogen production amount is suppressed. For that reason, the variation in the amount of hydrogen produced in the one of the first exhaust gas purification unit and the second exhaust gas purification unit which is relatively large in the hydrogen production amount is reduced. As a result, even in the case where the three-way catalyst or the NSR catalyst has deteriorated, the variation in the amount of the hydrogen flowing into the third exhaust gas purification unit at the time of performing the inducement processing can be suppressed as small as possible. Accordingly, it becomes possible to diagnose deterioration of the SCR catalyst with sufficient accuracy, by using the third air fuel ratio sensor and the fourth air fuel ratio sensor.

Here, note that the "first rich air fuel ratio" referred to herein corresponds to the measured value of the first air fuel ratio sensor at the time when the actual air fuel ratio of the exhaust gas flowing into the first exhaust gas purification unit becomes an air fuel ratio suitable for the production of hydrogen by the three-way catalyst. In addition, the "second rich air fuel ratio" referred to herein corresponds to the measured value of the second air fuel ratio sensor at the time when the actual air fuel ratio of the exhaust gas flowing into the second exhaust gas purification unit becomes an air fuel ratio suitable for the production of hydrogen by the NSR catalyst.

However, at the time of performing the inducement processing, a rich shift is caused in the second air fuel ratio sensor by the hydrogen produced in the first exhaust gas purification unit, but the magnitude of the rich shift in that case changes according to the deterioration degree of the three-way catalyst. Accordingly, in cases where the second hydrogen production amount is more than the first hydrogen production amount, and where the air fuel ratio of the exhaust gas discharged from the internal combustion engine is feedback-controlled so that the measured value of the second air fuel ratio sensor becomes the second predetermined rich air fuel ratio, it is desirable to change the second rich air fuel ratio according to the deterioration degree of the three-way catalyst (in other words, the amount of hydrogen produced in the three-way catalyst), in order to control the actual air fuel ratio of the exhaust gas flowing into the second exhaust gas purification unit to the air fuel ratio suitable for the production of hydrogen by the NSR catalyst. Here, in the case where the deterioration degree of the three-way catalyst is large, the amount of hydrogen produced in the first exhaust gas purification unit becomes smaller, in comparison with the case where the deterioration degree of the three-way catalyst is small. For that reason, when the second rich air fuel ratio in the case where the deterioration degree of the three-way catalyst is large is set to the same as that in the case where the deterioration degree of the three-way catalyst is small, the actual air fuel ratio of the exhaust gas flowing into the second exhaust gas purification unit may become lower than the air fuel ratio suitable for producing hydrogen in the NSR catalyst.

Accordingly, in the deterioration diagnosis device for an exhaust gas purification apparatus of the present invention, the controller may be configured to change the predetermined second rich air fuel ratio to a higher air fuel ratio when the deterioration degree of the three-way catalyst is large, in comparison with when it is small, in cases where the second hydrogen production amount is more than the first hydrogen production amount and where the air fuel ratio of the exhaust gas discharged from the internal combustion engine is controlled so that the measured value of the second air fuel ratio sensor becomes the second predetermined rich air fuel ratio. Thus, when the second predetermined rich air fuel ratio is corrected according to the deterioration degree of the three-way catalyst in this manner, it is possible to control the actual air fuel ratio of the exhaust gas flowing into the second exhaust gas purification unit to the air fuel ratio suitable for producing hydrogen in the NSR catalyst, even if the deterioration degree of the three-way catalyst changes.

Here, the controller may calculate an amount of shift between the measured value of the second air fuel ratio sensor and the actual air fuel ratio (a magnitude of the rich shift of the second air fuel ratio sensor) at the time of execution of the inducement processing, by using as parameters the deterioration degree of the three-way catalyst and the measured value of the first air fuel ratio sensor at the time of performing the inducement processing, and may change the second predetermined rich air fuel ratio in such a manner that the smaller the amount of shift, the higher the second predetermined rich air fuel ratio is made. The magnitude of the rich shift of the second air fuel ratio sensor at the time of performing the inducement processing is correlated with the deterioration degree of the three-way catalyst and the air fuel ratio of the exhaust gas flowing into the first exhaust gas purification unit (the measured value of the first air fuel ratio sensor). For example, the magnitude of the rich shift of the second air fuel ratio sensor at the time of performing the inducement processing becomes smaller as the deterioration degree of the three-way catalyst becomes larger, and as the measured value of the first air fuel ratio sensor becomes higher or larger. Accordingly, the magnitude of the rich shift of the second air fuel ratio sensor at the time of performing the inducement processing can be obtained by using as parameters the deterioration degree of the three-way catalyst and the measured value of the first air fuel ratio sensor. Then, when the predetermined second rich air fuel ratio is changed to the higher air fuel ratio as the rich shift of the second air fuel ratio sensor becomes smaller, the actual air fuel ratio of the exhaust gas flowing into the second exhaust gas purification unit can be controlled to the air fuel ratio suitable for producing hydrogen in the NSR catalyst, even if the deterioration degree of the three-way catalyst changes.

According to the present invention, deterioration of an SCR catalyst can be diagnosed with sufficient accuracy, by making use of a sensor for measuring an air fuel ratio of exhaust gas flowing into an exhaust gas purification apparatus, which is equipped with the SCR catalyst, and a sensor for measuring an air fuel ratio of exhaust gas flowing out of the exhaust gas purification apparatus.

Further features of the present invention will become apparent from the following description of exemplary embodiment with reference to the attached drawings.

DESCRIPTION OF EMBODIMENTS

Hereinafter, a specific embodiment of the present invention will be described based on the attached drawings. However, the dimensions, materials, shapes, relative arrangements and so on of component parts described in the embodiment are not intended to limit the technical scope of the present invention to these alone in particular as long as there are no specific statements.

Figure 1:
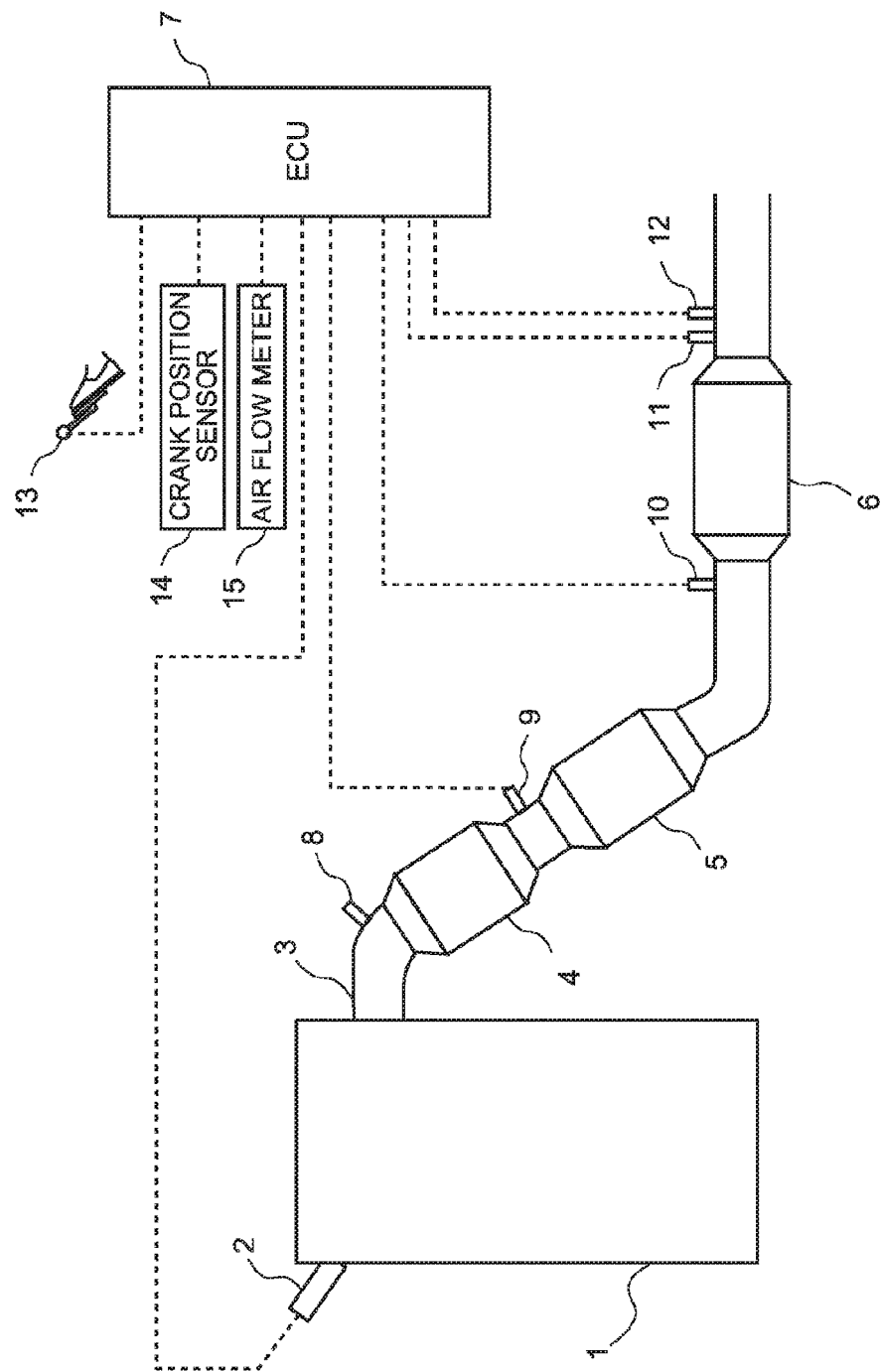
FIG. 1 is a view illustrating a schematic construction of an exhaust system of an internal combustion engine, to which the present invention is applied.

FIG. 1 is a view illustrating a schematic construction of an exhaust system of an internal combustion engine, to which the present invention is applied. The internal combustion engine 1 shown in FIG. 1 is a spark ignition type internal combustion engine (gasoline engine) which is able to be operated by combusting a mixture having a lean air fuel ratio higher than a stoichiometric air fuel ratio (which is capable of lean burn operation), but may instead be a compression ignition type internal combustion engine.

The internal combustion engine 1 is provided with fuel injection valves 2 for supplying fuel to individual cylinders, respectively. Each of the fuel injection valves 2 may be a valve mechanism which serves to inject fuel into an intake port of each corresponding cylinder, or may be a valve mechanism which serves to inject fuel into each corresponding cylinder.

An exhaust pipe 3 is connected to the internal combustion engine 1. The exhaust pipe 3 is a pipe having a passage through which a gas (exhaust gas) combusted or burned in the interior of each cylinder of the internal combustion engine 1 flows. A first catalyst casing 4 is arranged on the way of the exhaust pipe 3. The first catalyst casing 4 receives a honeycomb structured body covered with a coat layer such as alumina, a precious metal (platinum (Pt), palladium (Pd), etc.) supported by the coat layer, and a promoter or co-catalyst such as ceria ($CeO_2$) supported by the coat layer. The first catalyst casing 4 corresponds to a "first exhaust gas purification unit" according to the present invention.

A second catalyst casing 5 is arranged in the exhaust pipe 3 at the downstream side of the first catalyst casing 4. The second catalyst casing 5 receives an occlusion or storage reduction catalyst (hereinafter, referred to as an NSR catalyst) with a NOx occlusion or storage material attached thereto. Specifically, the second catalyst casing 5 receives a honeycomb structured body covered with a coat layer such as alumina, a precious metal (platinum (Pt), palladium (Pd), etc.) supported by the coat layer, a promoter or co-catalyst such as ceria ($CeO_2$) supported by the coat layer, and an NOx occlusion or storage material (alkalies, alkaline earths, etc.) supported by the coat layer. The second catalyst casing 5 corresponds to a "second exhaust gas purification unit" according to the present invention.

A third catalyst casing 6 is arranged in the exhaust pipe 3 at the downstream side of the second catalyst casing 5. The third catalyst casing 6 receives an SCR catalyst. Specifically, the third catalyst casing 6 receives a honeycomb structured body made of cordierite or Fe—Cr—Al based heat resisting steel, a zeolite based coat layer covering the honeycomb structured body, and a transition metal (copper (Cu), iron (Fe), etc.) supported by the coat layer. The third catalyst casing 6 corresponds to a "third exhaust gas purification unit" according to the present invention.

In the internal combustion engine 1 constructed in this manner, there is arranged in combination therewith an ECU (Electronic Control Unit) 7. The ECU 7 is an electronic control unit which is composed of a CPU, a ROM, a RAM, a backup RAM, and so on. The ECU 7 is electrically connected to a variety of kinds of sensors such as a first air fuel ratio sensor 8, a second air fuel ratio sensor 9, a third air fuel ratio sensor 10, a fourth air fuel ratio sensor 11, an exhaust gas temperature sensor 12, an accelerator position sensor 13, a crank position sensor 14, an air flow meter 15, and so on.

The first air fuel ratio sensor 8 is mounted on the exhaust pipe 3 at a location upstream of the first catalyst casing 4, and outputs an electric signal correlated with an air fuel ratio of the exhaust gas which flows into the first catalyst casing 4. This first air fuel ratio sensor 8 corresponds to a "first air fuel ratio sensor" according to the present invention. Here, note that the air fuel ratio of the exhaust gas flowing into the first catalyst casing 4 may be calculated from a measured value of an oxygen concentration sensor that is mounted instead of the first air fuel ratio sensor 8.

The second air fuel ratio sensor 9 is mounted on the exhaust pipe 3 at a location between the first catalyst casing 4 and the second catalyst casing 5, and outputs an electric signal correlated with an air fuel ratio of the exhaust gas which flows into the second catalyst casing 5. This second air fuel ratio sensor 9 corresponds to a "second air fuel ratio sensor" according to the present invention. Here, note that the air fuel ratio of the exhaust gas flowing into the second catalyst casing 5 may be calculated from a measured value of an oxygen concentration sensor that is mounted instead of the second air fuel ratio sensor 9.

The third air fuel ratio sensor 10 is mounted on the exhaust pipe 3 at a location between the second catalyst casing 5 and the third catalyst casing 6, and outputs an electric signal correlated with an air fuel ratio of the exhaust gas which flows into the third catalyst casing 6. This third air fuel ratio sensor 10 corresponds to a "third air fuel ratio sensor" according to the present invention. Here, note that the air fuel ratio of the exhaust gas flowing into the third catalyst casing 6 may be calculated from a measured value of an oxygen concentration sensor that is mounted instead of the third air fuel ratio sensor 10.

The fourth air fuel ratio sensor 11 is mounted on the exhaust pipe 3 at a location downstream of the third catalyst casing 6, and outputs an electric signal correlated with an air fuel ratio of the exhaust gas which flows out from the third catalyst casing 6. This fourth air fuel ratio sensor 11 corresponds to a "fourth air fuel ratio sensor" according to the present invention. Here, note that the air fuel ratio of the exhaust gas flowing out from the third catalyst casing 6 may be calculated from a measured value of an oxygen concentration sensor that is mounted instead of the fourth air fuel ratio sensor 11.

The exhaust gas temperature sensor 12 is mounted on the exhaust pipe 3 at a location downstream of the third catalyst casing 6, and outputs an electrical signal correlated with a temperature of the exhaust gas flowing in the interior of the exhaust pipe 3. The accelerator position sensor 13 is mounted on an accelerator pedal, and outputs an electric signal correlated with an amount of operation of the accelerator pedal (i.e., a degree of accelerator opening). The crank position sensor 14 is mounted on the internal combustion engine 1, and outputs an electric signal correlated with a rotational position of an engine output shaft (crankshaft). The air flow meter 15 is mounted on an intake pipe (not shown) of the internal combustion engine 1, and outputs an electrical signal correlated with an amount (mass) of fresh air (i.e., air) flowing in the intake pipe.

The ECU 7 controls the operating state of the internal combustion engine 1 based on the output signals of the above-mentioned variety of kinds of sensors. For example, the ECU 7 calculates a target air fuel ratio of the mixture based on an engine load calculated from the output signal of the accelerator position sensor 13 (the accelerator opening degree) and an engine rotational speed calculated from the output signal of the crank position sensor 14. The ECU 7 calculates a target amount of fuel injection (a fuel injection period) based on the target air fuel ratio and an output signal (i.e., an intake air amount) of the air flow meter 15, and operates the fuel injection valves 2 according to the target amount of fuel injection thus calculated. At that time, the ECU 7 sets the target air fuel ratio to a lean air fuel ratio which is higher than the stoichiometric air fuel ratio, in cases where the operating state of the internal combustion engine 1 is in a low rotation and low load region or in a middle rotation and middle load region. In addition, the ECU 7 sets the target air fuel ratio to the stoichiometric air fuel ratio or a rich air fuel ratio which is lower than the stoichiometric air fuel ratio, in cases where the operating state of the internal combustion engine 1 is in a high load region or a high rotation region. Thus, when the operating state of the internal combustion engine 1 belongs to the low rotation and low load region or the middle rotation and middle load region (hereinafter, these operating regions being referred to as a "lean operating region"), the target air fuel ratio is set to a lean air fuel ratio, so that the internal combustion engine 1 is operated in a lean burn state, thereby making it possible to suppress the amount of fuel consumption to a low level.

In addition, the ECU 7 performs rich spike processing in an appropriate manner, when the operating state of the internal combustion engine 1 is in the above-mentioned lean operating region. The rich spike processing is to adjust the fuel injection amount and the intake air amount in such a manner that the concentration of oxygen in the exhaust gas becomes low and the concentration of hydrocarbon or carbon monoxide therein becomes high. The NSR catalyst received in the second catalyst casing 5 stores or adsorbs NOx in the exhaust gas, when the oxygen concentration of the exhaust gas flowing into the second catalyst casing 5 is high (i.e., when the air fuel ratio of the exhaust gas is a lean air fuel ratio), and releases the NOx stored in the NSR catalyst so as to reduce the NOx thus released to nitrogen ($N_2$) or ammonia ($NH_3$), when the oxygen concentration of the exhaust gas flowing into the second catalyst casing 5 is low, and when reducing components such as hydrocarbon (HC), carbon monoxide (CO), etc., are contained in the exhaust gas (i.e., when the air fuel ratio of the exhaust gas is a rich air fuel ratio). As a result, when rich spike processing is performed, the NOx storage capacity of the NSR catalyst will be regenerated.

Accordingly, the ECU 7 suppresses the NOx storage ability of the NSR catalyst from being saturated, by performing the rich spike processing, when an amount of NOx (an NOx storage amount) stored in the NSR catalyst of the second catalyst casing 5 becomes equal to or larger than a fixed amount, or when the operation time of the internal combustion engine 1 from the end time of the last rich spike processing (preferably, the operation time in which the target air fuel ratio has been set to the lean air fuel ratio) becomes equal to or more than a fixed period of time, or when the travel distance of a vehicle, on which the internal combustion engine 1 is mounted, from the end time of the last rich spike processing (preferably, the travel distance within which the target air fuel ratio has been set to the lean air fuel ratio) becomes equal to or more than a fixed distance.

Here, note that as a specific method of performing the rich spike processing, there can be used a method of decreasing the air fuel ratio of a mixture to be supplied for combustion in the internal combustion engine 1, by performing at least one of processing to increase the target amount of fuel injection for the fuel injection valves 2, and processing to decrease the opening degree of an intake air throttle valve. In addition, in a construction in which each of the fuel injection valves 2 injects fuel directly into a corresponding cylinder, the rich spike processing may be carried out by a method of injecting fuel from each of the fuel injection valves 2 in the exhaust stroke of the corresponding cylinder.

Then, the SCR catalyst of the third catalyst casing 6 serves to adsorb ammonia contained in the exhaust gas and to reduce NOx contained in the exhaust gas by means of the ammonia thus adsorbed. The ammonia to be supplied to the SCR catalyst of the third catalyst casing 6 is produced in the three-way catalyst of the first catalyst casing 4 or the NSR catalyst of the second catalyst casing 5. For example, in cases where the rich spike processing is carried out, the hydrocarbon and hydrogen contained in the exhaust gas react with NOx to produce ammonia in the three-way catalyst of the first catalyst casing 4. In addition, in cases where the rich spike processing is performed, a part of the NOx desorbed from the NSR catalyst of the second catalyst casing 5 reacts with hydrocarbon or hydrogen in the exhaust gas so as to be reduced to ammonia. At that time, the amount of ammonia produced in the three-way catalyst or the NSR catalyst changes according to the interval in which the rich spike processing is carried out, the air fuel ratio of the exhaust gas at the time when the rich spike processing is performed, etc. Accordingly, when it is necessary to supply ammonia to the SCR catalyst, the ECU 7 may set the performance interval of the rich spike processing to an interval suitable for production of ammonia, or may set the air fuel ratio of the exhaust gas while the rich spike processing is performed to an air fuel ratio (e.g., 14.1 or thereabout) suitable for production of ammonia.

When the rich spike processing is performed according to a variety of purposes as referred to above, the NOx in the exhaust gas can be reduced or removed, even in cases where the lean burn operation of the internal combustion engine 1 is performed. However, when the SCR catalyst received in the third catalyst casing 6 deteriorates, the NOx having not been fully reduced in the second catalyst casing 5 at the time of the lean burn operation of the internal combustion engine 1 may be discharged into the atmosphere, without being reduced in the third catalyst casing 6, too. For that reason, in cases where the SCR catalyst of the third catalyst casing 6 has deteriorated, it is necessary to detect the deterioration of the SCR catalyst in a quick manner, so that the driver of a vehicle with the internal combustion engine 1 mounted thereon can be prompted to repair the SCR catalyst, or the lean burn operation of the internal combustion engine 1 can be inhibited.

Figure 2:
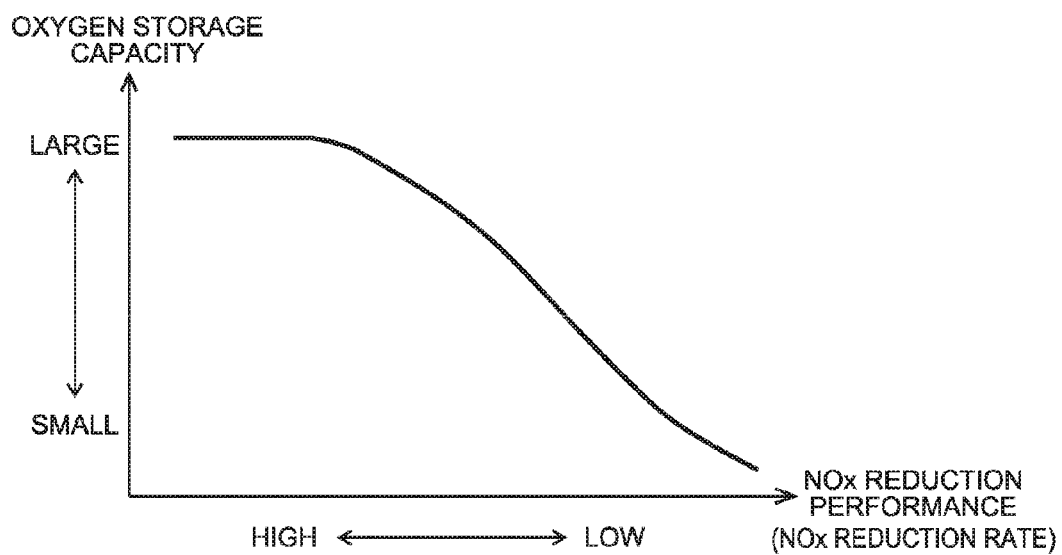
FIG. 2 is a view illustrating a correlation between NOx reduction performance and oxygen storage capacity of an SCR catalyst.

In the following, reference will be made to a method of diagnosing deterioration of the SCR catalyst received in the third catalyst casing 6. In this embodiment, the deterioration of the SCR catalyst is diagnosed based on the oxygen storage ability or capacity of the SCR catalyst. The SCR catalyst stores the oxygen in the exhaust gas by the effect of the transition metal with which the SCR catalyst is equipped, when the air fuel ratio of the exhaust gas is a lean air fuel ratio. Then, the oxygen stored in the SCR catalyst desorbs from the SCR catalyst, when the air fuel ratio of the exhaust gas changes from the lean air fuel ratio to a rich air fuel ratio. Such oxygen storage ability of the SCR catalyst is correlated with the NOx reduction performance of the SCR catalyst. FIG. 2 is a view showing the correlation between the NOx reduction performance of the SCR catalyst and the amount of oxygen able to be stored by the SCR catalyst (the oxygen storage capacity). As shown in FIG. 2, when the NOx reduction performance (the NOx reduction rate) of the SCR catalyst is sufficiently high (e.g., when the NOx reduction rate is 80%-100%), the oxygen storage capacity of the SCR catalyst also becomes sufficiently large, but when the NOx reduction performance of the SCR catalyst drops to some extent (e.g., the NOx reduction rate drops to less than 80%), the oxygen storage capacity of the SCR catalyst also becomes accordingly small. As a result, by obtaining the oxygen storage capacity of the SCR catalyst, it can be determined whether the NOx reduction performance of the SCR catalyst has deteriorated. For example, when the oxygen storage capacity of the SCR catalyst is smaller than a predetermined threshold value, a determination can be made that the NOx reduction performance of the SCR catalyst has deteriorated.

The oxygen storage capacity of the SCR catalyst is correlated with the amount of oxygen which desorbs from the SCR catalyst in the case where the air fuel ratio of the exhaust gas has been changed from a lean air fuel ratio to a rich air fuel ratio. The amount of oxygen to desorb from the SCR catalyst in the case where the air fuel ratio of the exhaust gas has been changed from a lean air fuel ratio to a rich air fuel ratio can be obtained based on a difference between an air fuel ratio (or oxygen concentration) of the exhaust gas flowing into the SCR catalyst and an air fuel ratio (or oxygen concentration) of the exhaust gas flowing out from the SCR catalyst.

For example, in a state where the air fuel ratio of the exhaust gas has been changed from a lean air fuel ratio to a rich air fuel ratio, a difference between the measured value of the third air fuel ratio sensor 10 and the measured value of the fourth air fuel ratio sensor 11 is obtained, and by substituting the difference thus obtained into the following expression (1), an amount of oxygen Aox desorbed from the SCR catalyst can be obtained at each time point.

$$A_{ox} = \Delta A/F * \alpha * Q_{inj} \quad (1)$$

In the expression (1) above, $\Delta A/F$ is a value which is obtained by subtracting the measured value of the third air fuel ratio sensor 10 from the measured value of the fourth air fuel ratio sensor 11, where $\alpha$ is a mass ratio of the oxygen contained in the air, and $Q_{inj}$ is an amount of fuel injection.

Subsequently, a total amount of the oxygen desorbed from the SCR catalyst (oxygen storage capacity) can be obtained by carrying out the calculation processing using the above-mentioned expression (1) in a repeated manner and integrating the results of the calculations, in a period of time in which the air fuel ratio of the exhaust gas is maintained at a rich air fuel ratio. When deterioration diagnosis of the SCR catalyst is conducted based on the oxygen storage capacity obtained by such a method, it becomes possible to make the deterioration diagnosis of the SCR catalyst by using existing oxygen concentration sensors or existing air fuel ratio sensors.

However, the oxygen storage capacity of the normal SCR catalyst (the SCR catalyst in its undeteriorated state) is small in comparison with that of the three-way catalyst, the NSR catalyst, or the like, which includes an oxygen occlusion or storage material such as ceria. For that reason, when an error is included in the measured value of the third air fuel ratio sensor 10 or the fourth air fuel ratio sensor 11, the calculated value of the oxygen storage capacity may become smaller than the threshold value in spite of the fact that the SCR catalyst is normal, or the calculated value of the oxygen storage capacity may become equal to or more than the threshold value in spite of the fact that the SCR catalyst has deteriorated.

Accordingly, in this embodiment, at the time of obtaining the oxygen storage capacity of the SCR catalyst, inducement processing is performed in which a water gas shift reaction is induced in the three-way catalyst of the first catalyst casing 4 and the NSR catalyst of the second catalyst casing 5. The inducement processing referred to herein is processing in which when the operating state of the internal combustion engine 1 is in the lean operating region, the air fuel ratio of the exhaust gas flowing into each of the first catalyst casing 4 and the second catalyst casing 5 is made to be a rich air fuel ratio suitable for the water gas shift reaction, and is processing in which the air fuel ratio of the mixture to be supplied for combustion in the internal combustion engine 1 and the air fuel ratio of the exhaust gas to be discharged from the internal combustion engine 1 are each made to be a rich air fuel ratio, by carrying out at least one of an increase in the amount of fuel injection and a decrease in the amount of intake air, similar to the above-mentioned rich spike processing.

When the air fuel ratio of the exhaust gas discharged from the internal combustion engine 1 is changed from a lean air fuel ratio into a rich air fuel ratio by the execution of the inducement processing, the exhaust gas of a rich air fuel ratio flows into each of the first catalyst casing 4 and the second catalyst casing 5, so that the water gas shift reaction will be promoted by the three-way catalyst of the first catalyst casing 4 and the NSR catalyst of the second catalyst casing 5. In other words, the reaction of water and carbon monoxide in the exhaust gas is promoted by the three-way catalyst of the first catalyst casing 4 and the NSR catalyst of the second catalyst casing 5, so that hydrogen and carbon dioxide are produced. The hydrogen produced in the first catalyst casing 4 and the second catalyst casing 5 arrives at the third air fuel ratio sensor 10 together with the exhaust gas. At that time, because the diffusion rate of the hydrogen is faster than that of any of the other exhaust gas components, most of the surface of a sensor element of the third air fuel ratio sensor 10 is covered with the hydrogen to become a rich atmosphere. As a result, a rich shift occurs in which the measured value of the third air fuel ratio sensor 10 becomes lower than an actual air fuel ratio of the exhaust gas. On the other hand, when the hydrogen having passed through the third air fuel ratio sensor 10 flows into the third catalyst casing 6, the hydroxide ions (OH) combined with the transition metal of the SCR catalyst react with the hydrogen in the exhaust gas thereby to produce water. In other words, the hydrogen produced in the first catalyst casing 4 and the second catalyst casing 5 is oxidized and consumed in the third catalyst casing 6. As a result, the rich shift of the fourth air fuel ratio sensor 11 becomes smaller than the rich shift of the third air fuel ratio sensor 10. Accordingly, when the SCR catalyst has not deteriorated in the case where the above-mentioned inducement processing has been performed, there will also occur a difference between the measured value of the third air fuel ratio sensor 10 and the measured value of the fourth air fuel ratio sensor 11 resulting from the amount of hydrogen which is oxidized by the SCR catalyst of the third catalyst casing 6, in addition to a difference therebetween resulting from the amount of oxygen to desorb from the SCR catalyst of the third catalyst casing 6. On the other hand, when the SCR catalyst has deteriorated in the case where the above-mentioned inducement processing has been performed, both of the oxygen storage ability and the hydrogen oxidation ability of the SCR catalyst drop or decrease, so that the amount of oxygen to desorb from the SCR catalyst decreases, and at the same time, the amount of hydrogen to be consumed in the SCR catalyst also decreases. As a result, the difference between the measured value of the third air fuel ratio sensor 10 and the measured value of the fourth air fuel ratio sensor 11 becomes small.

In other words, when the SCR catalyst has not deteriorated at the time of performing the inducement processing, the integrated value of the difference (the total sensor output difference) between the measured value of the third air fuel ratio sensor 10 and the measured value of the fourth air fuel ratio sensor 11 in the period of time of the execution of the inducement processing becomes large due to the synergetic effect of the oxygen storage ability and the hydrogen oxidation ability of the SCR catalyst. In contrast to this, when the SCR catalyst has deteriorated at the time of performing the inducement processing, the total sensor output difference becomes small due to the synergetic effect of a decrease in the oxygen storage ability and a decrease in the hydrogen oxidation ability of the SCR catalyst. As a result, a remarkable difference will occur in the total sensor output difference between the case where the SCR catalyst of the second catalyst casing 5 has not deteriorated and the case where the SCR catalyst has deteriorated, and hence, it can be determined with high precision whether the SCR catalyst has deteriorated.

Here, note that when the inducement processing is performed in a state where the three-way catalyst in the first catalyst casing 4 has stored oxygen, hydrogen is not produced in any of the first catalyst casing 4 and the second catalyst casing 5 until the oxygen stored in the three-way catalyst has fully desorbed therefrom. Accordingly, in this embodiment, before performing out the inducement processing, processing of desorbing oxygen from the three-way catalyst of the first catalyst casing 4 (hereinafter, referred to as "O$_2$ desorption processing") is carried out. The O$_2$ desorption processing referred to herein is to make the air fuel ratio of the exhaust gas flowing into the first catalyst casing 4 to be a rich air fuel ratio, which is lower than that at the time of performing the inducement processing, by setting the air fuel ratio of a mixture to be combusted in the internal combustion engine 1 to a lower rich air fuel ratio in comparison with the execution time of the inducement processing. When such O$_2$ desorption processing is carried out, the oxygen stored in the three-way catalyst can be made to desorb therefrom quickly. In the following, a rich air fuel ratio suitable for the O$_2$ desorption processing is referred to as an air fuel ratio for desorption, and a rich air fuel ratio suitable for the inducement processing is referred to as an air fuel ratio for diagnosis.

Figure 3:
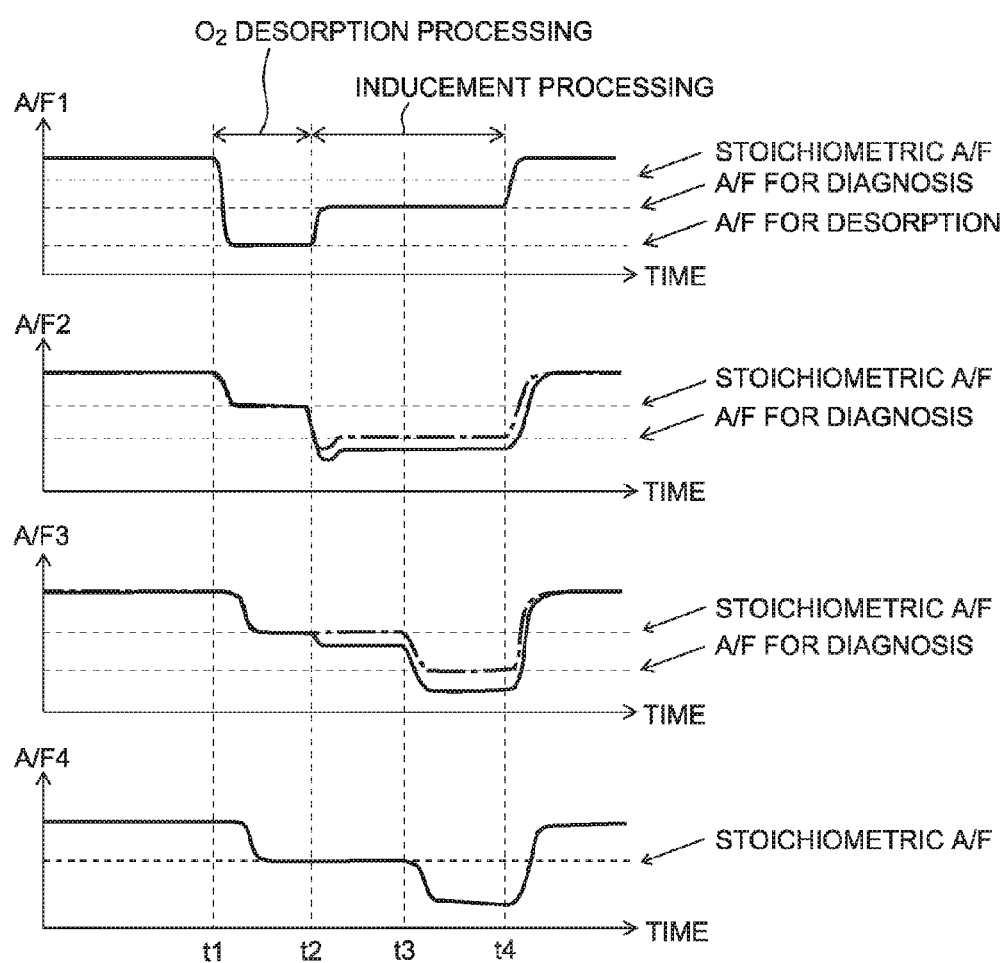
FIG. 3 is a timing chart showing measured values of a first air fuel ratio sensor, a second air fuel ratio sensor, a third air fuel ratio sensor and a fourth air fuel ratio sensor, when $O_2$ desorption processing and inducement processing are executed.

Here, a method for carrying out the O$_2$ desorption processing and the inducement processing will be described in line with a timing chart of FIG. 3. FIG. 3 is the timing chart showing the measured values of the first air fuel ratio sensor 8, the second air fuel ratio sensor 9, the third air fuel ratio sensor 10 and the fourth air fuel ratio sensor 11, in the case where the O$_2$ desorption processing and the inducement processing are performed. Here, note that the measured values shown in FIG. 3 are the ones when the SCR catalyst has not deteriorated. In addition, in FIG. 3, A/F1 represents the measured value of the first air fuel ratio sensor 8; A/F2 represents the measured value of the second air fuel ratio sensor 9; A/F3 represents the measured value of the third air fuel ratio sensor 10; and A/F4 represents the measured value of the fourth air fuel ratio sensor 11.

In FIG. 3, when the O$_2$ desorption processing is started (t1 in FIG. 3), the air fuel ratio of the exhaust gas discharged from the internal combustion engine 1 changes from a lean air fuel ratio to the air fuel ratio for desorption ("A/F for desorption" in FIG. 3), and the measured value (A/F1) of the first air fuel ratio sensor 8 also accordingly changes from the lean air fuel ratio to the air fuel ratio for desorption. When the exhaust gas of the air fuel ratio for desorption flows into the first catalyst casing 4, the oxygen stored in the three-way catalyst desorbs from the three-way catalyst, so that the air fuel ratio of the exhaust gas flowing out from the first catalyst casing 4 becomes the stoichiometric air fuel ratio ("stoichiometric A/F" in FIG. 3). In that case, the measured value (A/F2) of the second air fuel ratio sensor 9 also becomes the stoichiometric air fuel ratio. When the air fuel ratio of the exhaust gas flowing out from the first catalyst casing 4 becomes the stoichiometric air fuel ratio, the air fuel ratio of the exhaust gas flowing out from the second catalyst casing 5, and the air fuel ratio of the exhaust gas flowing out from the third catalyst casing 6 will also become the stoichiometric air fuel ratio, so that the measured value (A/F3) of the third air fuel ratio sensor 10 and the measured value (A/F4) of the fourth air fuel ratio sensor 11 also become the stoichiometric air fuel ratio.

When all the oxygen stored in the three-way catalyst has fully desorbed therefrom by the O$_2$ desorption processing, the air fuel ratio of the exhaust gas flowing out from the first catalyst casing 4 will change from the stoichiometric air fuel ratio to a rich air fuel ratio (t2 in FIG. 3). In addition, when all the oxygen has fully desorbed from the three-way catalyst, a water gas shift reaction will occur in the three-way catalyst, so that the measured value (A/F2) of the second air fuel ratio sensor 9 shifts to an air fuel ratio (shown by a solid line in FIG. 3) lower than an actual air fuel ratio (shown by an alternate long and short dash line in FIG. 3). Thus, when the measured value (A/F2) of the second air fuel ratio sensor 9 changes from the stoichiometric air fuel ratio to the rich air fuel ratio in this manner, the ECU 7 starts the inducement processing by changing the air fuel ratio of the mixture to be supplied for combustion in the internal combustion engine 1 from the air fuel ratio for desorption to the air fuel ratio for diagnosis ("A/F for diagnosis" in FIG. 3).

When the inducement processing is started, an actual air fuel ratio of the exhaust gas flowing into the first catalyst casing 4 becomes the air fuel ratio for diagnosis, and the measured value (A/F1) of the first air fuel ratio sensor 8 also accordingly becomes equal to the air fuel ratio for diagnosis. At that time, the actual air fuel ratio (the alternate long and short dash line in FIG. 3) of the exhaust gas flowing out from the first catalyst casing 4 becomes equal to the air fuel ratio for diagnosis, but the measured value (A/F2) of the second air fuel ratio sensor 9 shifts to an air fuel ratio lower than the air fuel ratio for diagnosis under the influence of the hydrogen produced in the three-way catalyst (the solid line in FIG. 3).

When the actual air fuel ratio of the exhaust gas flowing out from the first catalyst casing 4 becomes the air fuel ratio for diagnosis, the exhaust gas of the air fuel ratio for diagnosis will flow into the second catalyst casing 5, so that the oxygen stored in the NSR catalyst of the second catalyst casing 5 begins to desorb. When the oxygen desorbs from the NSR catalyst of the second catalyst casing 5, the actual air fuel ratio of the exhaust gas flowing out from the second catalyst casing 5 becomes the stoichiometric air fuel ratio. However, the measured value of the third air fuel ratio sensor 10 shifts to an air fuel ratio lower than the stoichiometric air fuel ratio under the influence of the hydrogen produced in the three-way catalyst of the first catalyst casing 4. Moreover, the hydrogen produced in the first catalyst casing 4 is consumed by the SCR catalyst of the third catalyst casing 6, so that the measured value of the fourth air fuel ratio sensor 11 becomes equal to the actual air fuel ratio (the stoichiometric air fuel ratio). Then, when all the oxygen stored in the NSR catalyst of the second catalyst casing 5 has fully desorbed therefrom (t3 in FIG. 3), the actual air fuel ratio of the exhaust gas flowing out from the second catalyst casing 5 will drop or decrease from the stoichiometric air fuel ratio to the air fuel ratio for diagnosis. Here, note that when all the oxygen stored in the NSR catalyst of the second catalyst casing 5 has fully desorbed therefrom, a water gas shift reaction also occurs in the NSR catalyst of the second catalyst casing 5, in addition to the three-way catalyst of the first catalyst casing 4, so that the rich shift of the measured value of the third air fuel ratio sensor 10 becomes larger than that in a period of time in which the oxygen desorbs from the NSR catalyst (i.e., a period of time of t2-t3 in FIG. 3).

When the actual air fuel ratio of the exhaust gas flowing out from the second catalyst casing 5 drops to the air fuel ratio for diagnosis, the actual air fuel ratio of the exhaust gas flowing out from the third catalyst casing 6 (an alternate long and short dash line in FIG. 3) and the measured value of the fourth air fuel ratio sensor 11 (A/F4 in FIG. 3) begins to drop to a rich air fuel ratio which is lower than the stoichiometric air fuel ratio. However, oxygen desorbs from the SCR catalyst of the third catalyst casing 6, so that the measured value (A/F3) of the fourth air fuel ratio sensor 11 becomes higher than the measured value (A/F3) of the third air fuel ratio sensor 10. In addition, the measured value (A/F3) of the third air fuel ratio sensor 10 causes a rich shift under the influence of the hydrogen produced in the first catalyst casing 4 and the second catalyst casing 5. In contrast to this, the hydrogen produced in the first catalyst casing 4 and the second catalyst casing 5 is oxidized and consumed by the SCR catalyst in the third catalyst casing 6, so that there hardly occurs any rich shift of the measured value of the fourth air fuel ratio sensor 11. As a result, even after all the oxygen stored in the SCR catalyst of the third catalyst casing 6 has desorbed, there occurs a sufficient difference between the measured value (A/F3) of the third air fuel ratio sensor 10 and the measured value (A/F4) of the fourth air fuel ratio sensor 11. This difference continuously occurs until an end time point of the inducement processing (i.e., at t4 in FIG. 3).

When the $O_2$ desorption processing and the inducement processing are performed by the method shown in FIG. 3, a remarkable difference occurs in the total sensor output difference between the case where the SCR catalyst of the third catalyst casing 6 has not deteriorated and the case where the SCR catalyst has deteriorated, and hence, it can be determined with higher precision whether the SCR catalyst has deteriorated.

However, when the amount of the hydrogen flowing into the third catalyst casing 6 at the time of performing the inducement processing varies, the total sensor output difference may also vary, so that it may not be able to be determined with accuracy whether deterioration of the SCR catalyst of the third catalyst casing 6 has deteriorated. The variation in the amount of the hydrogen flowing into the third catalyst casing 6 at the time of performing the inducement processing results from the variation in the air fuel ratio of the exhaust gas flowing into the first catalyst casing 4 or the second catalyst casing 5 at the time of performing the inducement processing. For that reason, it is desirable to feedback-control the air fuel ratio of the exhaust gas discharged from the internal combustion engine 1 (i.e., the air fuel ratio of a mixture to be combusted in the internal combustion engine 1), so that the air fuel ratio of the exhaust gas flowing into the one of the first catalyst casing 4 and the second catalyst casing 5 in which the hydrogen production amount is larger than that in the other is converged to the air fuel ratio for diagnosis. However, the amounts of hydrogen produced in the first catalyst casing 4 and the second catalyst casing 5 change according to the degrees of deterioration of the three-way catalyst and the NSR catalyst, respectively. Accordingly, in this embodiment, the amount of hydrogen produced in the first catalyst casing 4 (a first hydrogen production amount) and the amount of hydrogen produced in the second catalyst casing 5 (a second hydrogen production amount) at the time of performing the inducement processing are estimated, based on the deterioration degree of the three-way catalyst and the deterioration degree of the NSR catalyst, respectively, and in cases where the estimated first hydrogen production amount is more than the estimated second hydrogen production amount, the air fuel ratio of the mixture is feedback-controlled so that the actual air fuel ratio of the exhaust gas flowing into the first catalyst casing 4 is made to be the air fuel ratio for diagnosis, whereas in cases where the estimated second hydrogen production amount is more than the estimated first hydrogen production amount, the air fuel ratio of the mixture is feedback-controlled so that the actual air fuel ratio of the exhaust gas flowing into the second catalyst casing 5 is made to be the air fuel ratio for diagnosis.

Here, the deterioration degree of the three-way catalyst of the first catalyst casing 4 can be obtained by measuring the oxygen storage capacity of the three-way catalyst. Specifically, in cases where the above-mentioned rich spike processing is carried out, etc., it is only necessary to integrate a difference between the measured value of the first air fuel ratio sensor 8 and the measured value of the second air fuel ratio sensor 9 in a period of time from a time point at which the air fuel ratio of the exhaust gas discharged from the internal combustion engine 1 has been changed from a lean air fuel ratio to a rich air fuel ratio, until a time point at which the air fuel ratio of the exhaust gas flowing out from the first catalyst casing 4 indicates a rich air fuel ratio, and to make a determination that the smaller an integrated value of the difference, the larger the deterioration degree of the three-way catalyst becomes. Here, note that the deterioration degree of the three-way catalyst of the first catalyst casing 4 may be obtained as follows: in cases where the above-mentioned rich spike processing is performed, etc., a difference between the measured value of the first air fuel ratio sensor 8 and the measured value of the second air fuel ratio sensor 9 after oxygen has been fully desorbed from the three-way catalyst (corresponding to an rich shift amount of the second air fuel ratio sensor 9) is obtained, and the deterioration degree of the three-way catalyst is obtained from the air fuel ratio of the exhaust gas flowing into the first catalyst casing 4 and the rich shift amount of the second air fuel ratio sensor 9, at the time of performing the rich spike processing. At that time, there is a tendency that the larger the deterioration degree of the three-way catalyst, the smaller becomes the rich shift amount of the second air fuel ratio sensor 9 becomes, and at the same time, the higher the air fuel ratio of the exhaust gas flowing into the first catalyst casing 4 at the time of performing the rich spike processing. Accordingly, the correlation among the rich shift amount of the second air fuel ratio sensor 9, the air fuel ratio of the exhaust gas flowing into the first catalyst casing 4, and the deterioration degree of the three-way catalyst may have been obtained experimentally in advance, and stored in the ROM of the ECU 7 as a map.

In addition, the deterioration degree of the NSR catalyst of the second catalyst casing 5 can be obtained by measuring the oxygen storage capacity of the NSR catalyst, similar to the above-mentioned three-way catalyst. Specifically, in cases where the above-mentioned rich spike processing is carried out, etc., in a period of time from a time point at which oxygen has been fully desorbed from the three-way catalyst of the first catalyst casing 4 (i.e., a time point at which the air fuel ratio of the exhaust gas flowing out from the first catalyst casing 4 has changed from an air fuel ratio equal to or higher than the stoichiometric air fuel ratio to a rich air fuel ratio), until a time point at which the air fuel ratio of the exhaust gas flowing out from the second catalyst casing 5 indicates a rich air fuel ratio, it is only necessary to integrate a difference between the measured value of the second air fuel ratio sensor 9 and the measured value of the third air fuel ratio sensor 10, and to make a determination that the smaller an integrated value of the difference, the larger the deterioration degree of the NSR catalyst becomes. Here, note that, as described in the aforementioned FIG. 3, when the oxygen has fully desorbed from the three-way catalyst, a water gas shift reaction occurs in the three-way catalyst, so that a rich shift occurs in which the measured value of the second air fuel ratio sensor 9 becomes lower than the actual air fuel ratio of the exhaust gas. However, a rich shift due to the hydrogen produced in the three-way catalyst also occurs in the measured value of the third air fuel ratio sensor 10, and hence, the integrated value of the difference between the measured value of the second air fuel ratio sensor 9 and the measured value of the third air fuel ratio sensor 10 becomes a value which reflects an amount of the oxygen desorbed from the NSR catalyst, without including the rich shift amount due to the hydrogen produced in the three-way catalyst.

Figure 4:
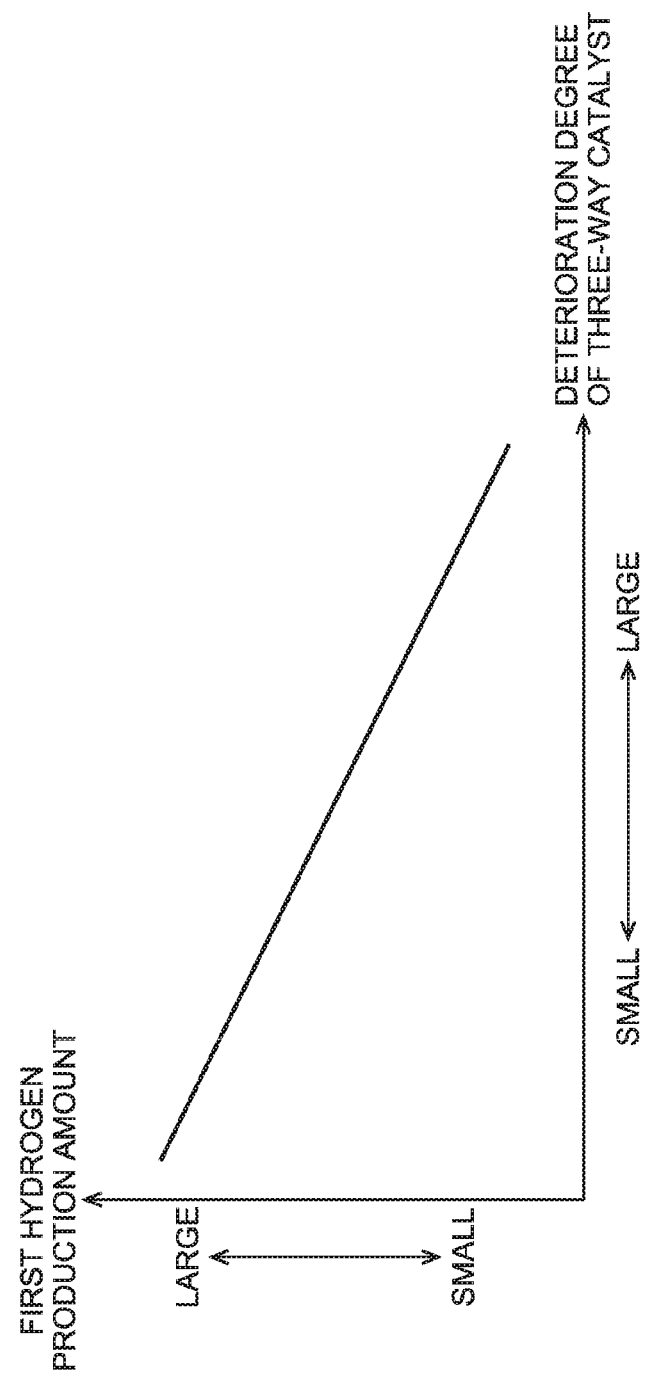
FIG. 4 is a view showing a correlation between a deterioration degree of a three-way catalyst and a first hydrogen production amount.
Figure 5:
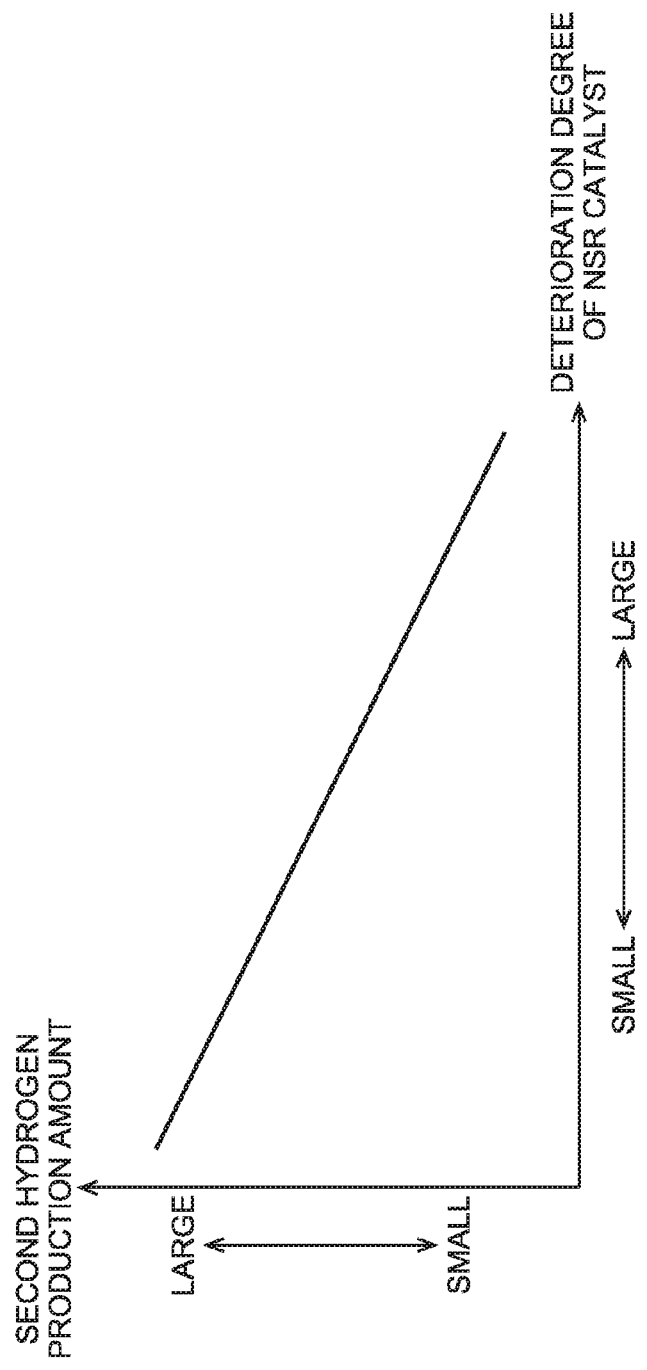
FIG. 5 is a view showing a correlation between a deterioration degree of an NSR catalyst and a second hydrogen production amount.

When the degrees of deterioration of the three-way catalyst and the NSR catalyst are obtained by means of the above-mentioned method, the ECU 7 calculates an amount of hydrogen produced per unit time in the three-way catalyst (the first hydrogen production amount) at the time when the exhaust gas of the air fuel ratio for diagnosis flows into the first catalyst casing 4, and an amount of hydrogen produced per unit time in the NSR catalyst (the second hydrogen production amount) at the time when the exhaust gas of the air fuel ratio for diagnosis flows into the second catalyst casing 5. Here, note that the first hydrogen production amount becomes smaller, as the deterioration degree of the three-way catalyst becomes larger, as shown in FIG. 4. In addition, the second hydrogen production amount becomes smaller, as the deterioration degree of the NSR catalyst becomes larger, as shown in FIG. 5. Accordingly, the correlations as shown in FIGS. 3 and 4 have been obtained experimentally in advance, and stored in the ROM of the ECU 7 in the form of a map. Then, the ECU 7 should only calculate the first hydrogen production amount and the second hydrogen production amount, by accessing the map described above, using as arguments the deterioration degree of the three-way catalyst and the deterioration degree of the NSR catalyst.

Figure 6:
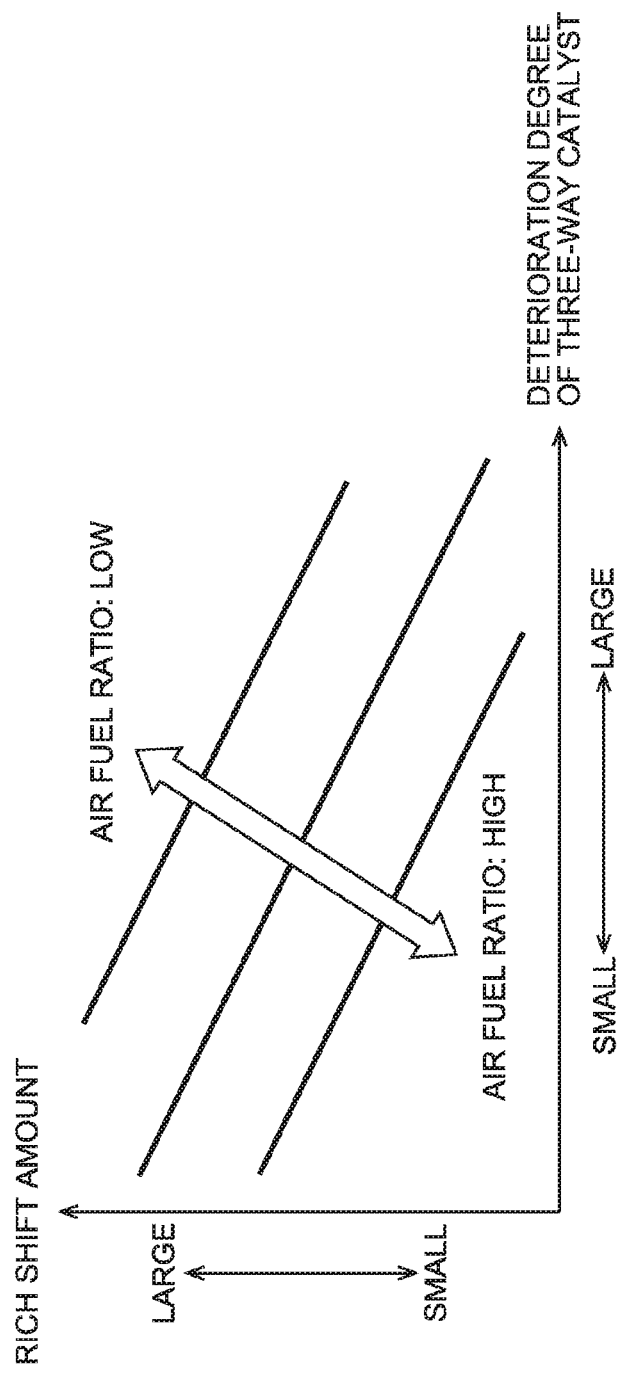
FIG. 6 is a view showing a correlation among the deterioration degree of the three-way catalyst, an air fuel ratio of exhaust gas flowing into a first catalyst casing, and an rich shift amount of the second fuel ratio sensor.

In cases where the first hydrogen production amount is more than the second hydrogen production amount, the ECU 7 feedback-controls the air fuel ratio of the mixture to be combusted in the internal combustion engine 1 so that the measured value of the first air fuel ratio sensor 8 is made to be a first rich air fuel ratio at the time of performing the inducement processing. On the other hand, in cases where the second hydrogen production amount is more than the first hydrogen production amount, the ECU 7 feedback-controls the air fuel ratio of the mixture to be combusted in the internal combustion engine 1 so that the measured value of the second air fuel ratio sensor 9 is made to be a second rich air fuel ratio at the time of performing the inducement processing. Here, note that the "first rich air fuel ratio" referred to herein is an air fuel ratio equal to the air fuel ratio for diagnosis. On the other hand, the "second rich air fuel ratio" is an air fuel ratio which is obtained by adding the rich shift amount of the second air fuel ratio sensor 9 resulting from the hydrogen produced in the three-way catalyst of the first catalyst casing 4 to the air fuel ratio for diagnosis. The rich shift amount of the second air fuel ratio sensor 9 resulting from the hydrogen produced in the three-way catalyst of the first catalyst casing 4 is correlated with the air fuel ratio of the exhaust gas flowing into the first catalyst casing 4 and the deterioration degree of the three-way catalyst. For example, as shown in FIG. 6, the rich shift amount of the second air fuel ratio sensor 9 becomes smaller, as the air fuel ratio of the exhaust gas flowing into the first catalyst casing 4 becomes higher, and as the deterioration degree of the three-way catalyst becomes larger. Accordingly, the correlation as shown in FIG. 6 has been obtained experimentally in advance, and stored in the ROM of the ECU 7 in the form of a map, whereby at the time of performing the inducement processing, the rich shift amount of the second air fuel ratio sensor 9 may be obtained by using as arguments the air fuel ratio of the exhaust gas flowing into the first catalyst casing 4 (the air fuel ratio for diagnosis), and the deterioration degree of the three-way catalyst. Then, the ECU 7 obtains the second rich air fuel ratio by adding the rich shift amount of the second air fuel ratio sensor 9 obtained by the above-mentioned method to the air fuel ratio for diagnosis. The second rich air fuel ratio obtained in this manner becomes higher when the deterioration degree of the three-way catalyst is large than when it is small.

When the air fuel ratio of the mixture to be combusted in the internal combustion engine 1 is feedback-controlled by the above-mentioned method at the time of performing the inducement processing, the actual air fuel ratio of the exhaust gas flowing into the one of the first catalyst casing 4 and the second catalyst casing 5 which is relatively large in the hydrogen production amount can be stabilized at the air fuel ratio for diagnosis. For that reason, the variation in the amount of hydrogen produced in the one of the first catalyst casing 4 and the second catalyst casing 5 which is relatively large in the hydrogen production amount is reduced. As a result, even in the case where the three-way catalyst of the first catalyst casing 4 or the NSR catalyst of the second catalyst casing 5 has deteriorated, the variation in the amount of the hydrogen flowing into the third catalyst casing 6 at the time of performing the inducement processing can be made small.

Figure 7:
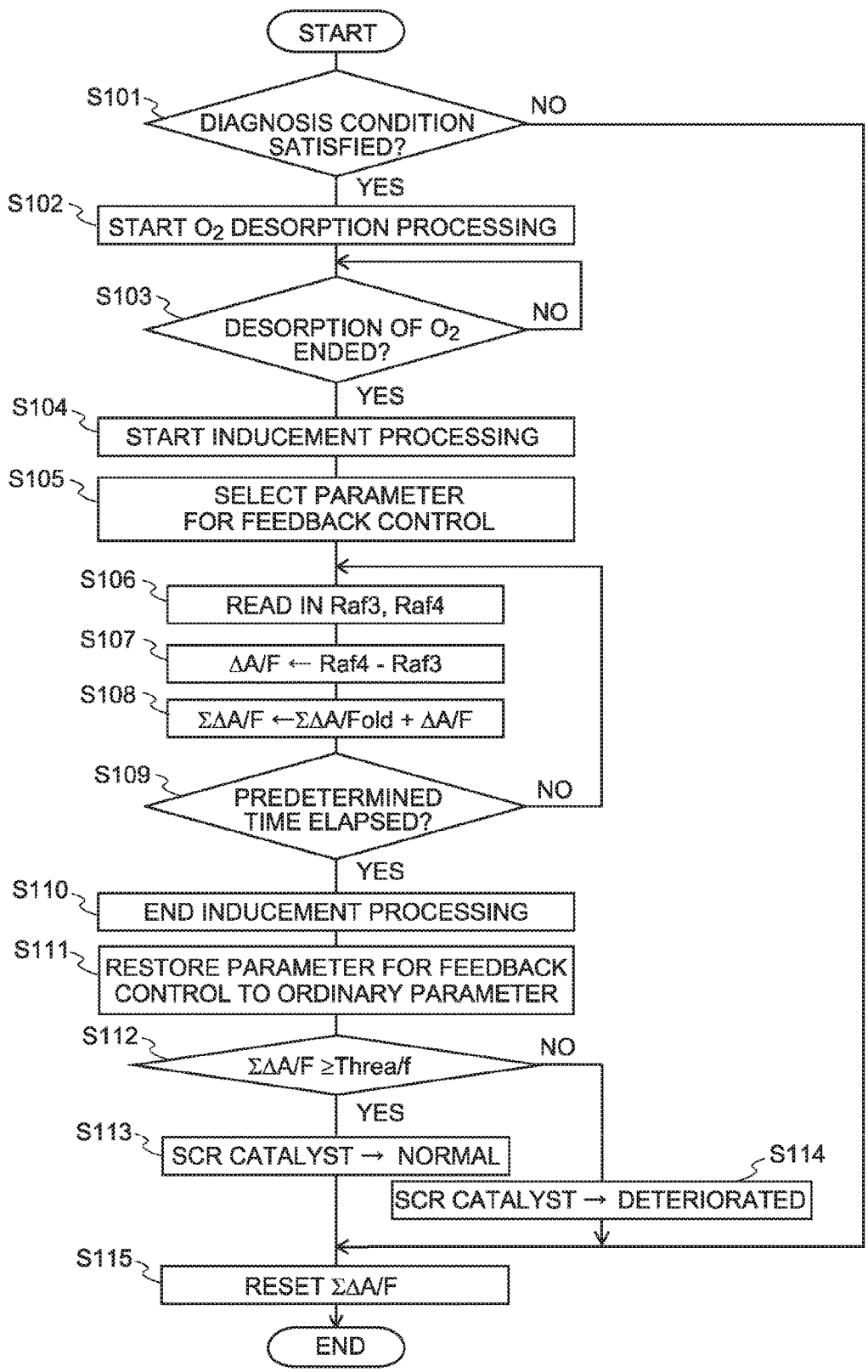
FIG. 7 is a flow chart showing a processing routine performed by an ECU when deterioration diagnosis of the SCR catalyst is performed.

In the following, a procedure of diagnosing the deterioration of the SCR catalyst in this embodiment will be explained along FIG. 7. FIG. 7 is a flow chart showing a processing routine which is carried out by the ECU 7 at the time of making a deterioration diagnosis of the SCR catalyst. The processing routine in FIG. 7 has been beforehand stored in the ROM of the ECU 7, and is carried out in a repeated manner by the ECU 7 when the operating state of the internal combustion engine 1 is in the lean operating region.

In the processing routine of FIG. 7, first in the processing of step S101, the ECU 7 determines whether a diagnosis condition is satisfied. The diagnosis condition referred to herein includes: the operating state of the internal combustion engine 1 is in the lean operating region; the three-way catalyst of the first catalyst casing 4, the NSR catalyst of the second catalyst casing 5 and the SCR catalyst of the third catalyst casing 6 have been activated; the first through fourth air fuel ratio sensors 8, 9, 10 and 11 are normal, etc. Here, note that when the inducement processing is performed in a state where the intake air amount is relatively small, the period of time spent performing the inducement processing may be prolonged. On the other hand, when the inducement processing is performed in a state where the intake air amount is relatively large, the amount of hydrogen passing through the SCR catalyst may become large. Accordingly, a range of the intake air amount may have been obtained in advance in which a balance between the length of the execution period of time of the inducement processing and the amount of hydrogen passing through the SCR catalyst becomes optimal, and a condition that an actual amount of intake air (a measured value of the air flow meter 15) falls in the range may be added to the above-mentioned diagnosis condition. In addition, the temperature of the SCR catalyst may change while the inducement processing is performed, and when a change in the amount of hydrogen oxidation with respect to a change in the temperature of the SCR catalyst becomes large, a change in the total sensor output difference resulting from the temperature change may become large. Accordingly, a temperature range has been obtained in advance in which the change in the amount of hydrogen oxidation with respect to the temperature change of the SCR catalyst becomes relatively small, and a condition that the temperature of the SCR catalyst belongs to the temperature range may also be added to the above-mentioned diagnosis condition.

In cases where a negative determination is made in the processing of step S101, the ECU 7 ends the execution of this processing routine. On the other hand, in cases where an affirmative determination is made in the processing of step S101, the routine of the ECU 7 goes to the processing of step S102. In the processing of step S102, the ECU 7 starts the $O_2$ desorption processing by changing the air fuel ratio of the mixture to be combusted in the internal combustion engine 1 from a lean air fuel ratio to the air fuel ratio for desorption. When the $O_2$ desorption processing is started, the air fuel ratio of the exhaust gas flowing into the first catalyst casing 4 changes from the lean air fuel ratio to a rich air fuel ratio, so the oxygen stored in the three-way catalyst of the first catalyst casing 4 desorbs therefrom.

In the processing of step S103, the ECU 7 determines whether the desorption of oxygen from the three-way catalyst has ended. Specifically, when the measured value of the second air fuel ratio sensor 9 indicates the stoichiometric air fuel ratio, the ECU 7 makes a determination that the desorption of oxygen from the three-way catalyst has not ended, whereas when the measured value of the second air fuel ratio sensor 9 indicates a rich air fuel ratio, the ECU 7 makes a determination that the desorption of oxygen from the three-way catalyst has ended. In cases where a negative determination is made in the processing of step S103, the ECU 7 carries out the processing of step S103 in a repeated manner. On the other hand, in cases where an affirmative determination is made in the processing of step S103, the routine of the ECU 7 goes to the processing of step S104. In the processing of step S104, the ECU 7 starts the inducement processing by changing the air fuel ratio of the mixture to be combusted in the internal combustion engine 1 from the air fuel ratio for desorption to the air fuel ratio for diagnosis.

Figure 8:
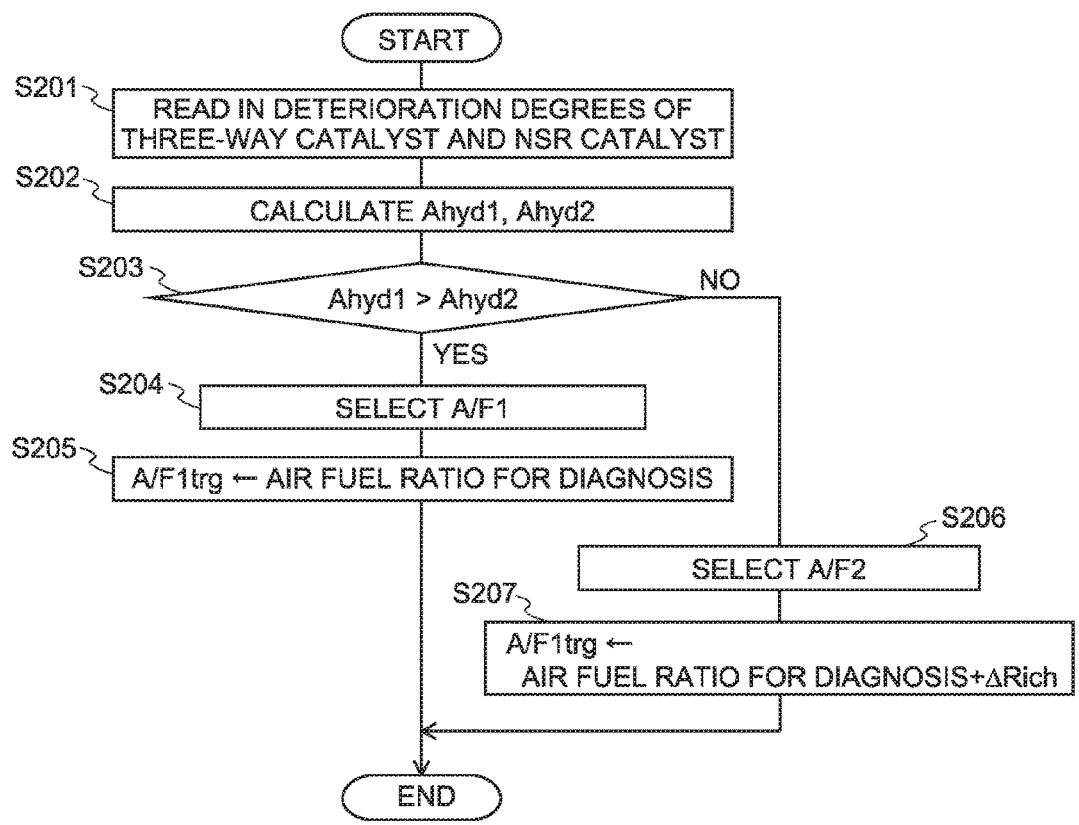
FIG. 8 is a flowchart showing a sub routine which is executed in the processing of step S105 in the processing routine of FIG. 7.

In the processing of step S105, the ECU 7 selects whether at the time of performing the inducement processing, the feedback control of the air fuel ratio of the mixture is carried out by using the measured value of the first air fuel ratio sensor 8 as a parameter, or by using the measured value of the second air fuel ratio sensor 9 as a parameter. Specifically, the ECU 7 selects a parameter for the feedback control in performing the inducement processing by executing a sub routine shown in FIG. 8. In the sub routine shown in FIG. 8, first in the processing of step S201, the ECU 7 reads in the deterioration degree of the three-way catalyst and the deterioration degree of the NSR catalyst obtained by the above-mentioned method. In the processing of step S202, the ECU 7 calculates the first hydrogen production amount Ahyd1 and the second hydrogen production amount Ahyd2, by accessing the maps shown in FIGS. 4 and 5, using as arguments the deterioration degree of the three-way catalyst and the deterioration degree of the NSR catalyst read in the processing of step S201. In the processing of step S203, the ECU 7 determines whether the first hydrogen production amount Ahyd1 calculated in the processing of step S202 is more than the second hydrogen production amount Ahyd2. In cases where an affirmative determination is made in the processing of step S203, the routine of the ECU 7 goes to the processing of step S204, where the measured value (A/F1) of the first air fuel ratio sensor 8 is selected as a parameter for the feedback control in performing the inducement processing. Then, the routine of the ECU 7 goes to the processing of step S205, where a target air fuel ratio (first rich air fuel ratio) A/F1trg in the feedback control is set to the air fuel ratio for diagnosis. In addition, in cases where a negative determination is made in the processing of step S203, the routine of the ECU 7 goes to the processing of step S206, where the measured value (A/F2) of the second air fuel ratio sensor 9 is selected as a parameter for the feedback control at the time of performing the inducement processing. Then, the routine of the ECU 7 goes to the processing of step S207, where the rich shift amount of the second air fuel ratio sensor 9 is calculated by accessing the above-mentioned map of FIG. 6 using as arguments the air fuel ratio of the exhaust gas flowing into the first catalyst casing 4 (the air fuel ratio for diagnosis), and the deterioration degree of the three-way catalyst, at the time of performing the inducement processing. Then, the ECU 7 sets an air fuel ratio, which is obtained by adding the rich shift amount of the second air fuel ratio sensor 9 to the air fuel ratio for diagnosis, as a target air fuel ratio (second rich air fuel ratio) A/Ftrg2 in the feedback control.

Here, returning to the processing routine of FIG. 7, the ECU 7 goes to the processing of step S106 after having performed the processing of step S105. In the processing of step S106, the ECU 7 reads in a measured value Raf3 of the third air fuel ratio sensor 10 and a measured value Raf4 of the fourth air fuel ratio sensor 11. Subsequently, the routine of the ECU 7 goes to the processing of step S107, where a sensor output difference ΔA/F is calculated by subtracting the measured value Raf3 of the third air fuel ratio sensor 10 from the measured value Raf4 of the fourth air fuel ratio sensor 11 read in the step S106. Then, in the processing of step S108, the ECU 7 calculates an integrated value (total sensor output difference) ΣΔA/F of the sensor output difference ΔA/F in a period of time from the start of the inducement processing to the current point in time. Specifically, the ECU 7 calculates the total sensor output difference ΣΔA/F in the period of time from the start of the inducement processing to the current point in time, by adding the difference ΔA/F thus calculated in the processing of step S107 to an integrated value ΣΔA/Fold of the sensor output difference ΔA/F in a period of time from the start of the inducement processing to the time when the last processing of step S108 is performed.

In the processing of step S109, the ECU 7 determines whether a predetermined period of time has elapsed from the start of the inducement processing. The predetermined period of time referred to herein is a period of time which is set in such a manner that the difference between the total sensor output difference in the case where the SCR catalyst is normal and the total sensor output difference in the case where the SCR catalyst has deteriorated becomes sufficiently large, as compared with a difference resulting from a measurement error of the third air fuel ratio sensor 10 or the fourth air fuel ratio sensor 11. At that time, the predetermined period of time may also be set as a period of time taken for the amount of hydrogen produced by the water gas shift reaction to reach a fixed amount which has been set in advance, or may also be set as a period of time taken for the amount of hydrogen oxidized by the SCR catalyst to reach a fixed amount set in advance in the case of assuming that the SCR catalyst is normal.

In cases where a negative determination is made in the processing of step S109, the routine of the ECU 7 returns to the processing of step S106, where the inducement processing is continuously performed. On the other hand, in cases where an affirmative determination is made in the processing of step S109, the routine of the ECU 7 goes to the processing of step S110, where the inducement processing is ended. In other words, the ECU 7 restores the air fuel ratio of the exhaust gas flowing into the first catalyst casing 4 from the rich air fuel ratio to a lean air fuel ratio which is suitable for the operating condition of the internal combustion engine 1. In addition, in the processing of step S111, the ECU 7 restores the parameter for the feedback control to an ordinary parameter (e.g., the measured value of the first air fuel ratio sensor 8).

After performing the processing of step S111, the routine of the ECU 7 goes to the processing of step S112, where it is determined whether the total sensor output difference ΣΔA/F calculated in the processing of step S108 is equal to or larger than a predetermined threshold value Threa/f. The "predetermined threshold value Threa/f" referred to herein is a value at which it can be considered that when the total sensor output difference ΣΔA/F becomes less than the predetermined threshold value Threa/f, the NOx reduction performance of the SCR catalyst has deteriorated, and which has been obtained in advance by adaptation processing making the use of experiments, etc.

In cases where an affirmative determination is made in the processing of step S112 (ΣΔA/F≥Threa/f), the ECU 7 goes to the processing of step S113, where a determination is made that the SCR catalyst has not deteriorated (normal). On the other hand, in cases where a negative determination is made in the processing of step S112 (ΣΔA/F<Threa/f), the routine of the ECU 7 goes to the processing of step S114, where a determination is made that the SCR catalyst has deteriorated. In that case, the ECU 7 may prompt to repair the third catalyst casing 6 by making use of an alarm lamp, a display unit, or the like, which is arranged in a passenger compartment of the vehicle. After the execution of the processing of step S113 or S114, the routine of the ECU 7 goes to the processing of step S115, where the total sensor output difference ΣΔA/F is reset to zero.

When the deterioration diagnosis of the SCR catalyst is performed according to the procedure described above, the air fuel ratio of the exhaust gas flowing into the one of the three-way catalyst in the first catalyst casing 4 and the NSR catalyst in the second catalyst casing 5 which is relatively large in the hydrogen production amount can be stabilized at the air fuel ratio for diagnosis while the inducement processing is performed, so that the variation in the amount of hydrogen flowing into the SCR catalyst can be suppressed small. As a result, the variation in the total sensor output difference can be suppressed small, thus making it possible to determine in a more accurate manner whether the SCR catalyst of the third catalyst casing 6 has deteriorated.

Here, note that in the processing routine of FIG. 7, the deterioration diagnosis of the SCR catalyst is carried out based on the integrated value of the difference (the total sensor output difference) between the measured value of the third air fuel ratio sensor 10 and the measured value of the fourth air fuel ratio sensor 11 in the state where the inducement processing has been carried out, but the deterioration diagnosis of the SCR catalyst may be made based on an integrated value of a value (Aox) which is obtained by substituting the difference between the measured value of the third air fuel ratio sensor 10 and the measured value of the fourth air fuel ratio sensor 11 into the above-mentioned expression (1).

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2015-027003, filed on Feb. 13, 2015, which is hereby incorporated by reference herein in its entirety.

The invention claimed is:

1. A deterioration diagnosis device for an exhaust gas purification apparatus, comprising:
   a first exhaust gas purification unit that is arranged in an exhaust passage of an internal combustion engine capable of a lean burn operation, and is equipped with a three-way catalyst which serves to promote a water gas shift reaction when an air fuel ratio of exhaust gas is a rich air fuel ratio which is lower than a stoichiometric air fuel ratio;
   a second exhaust gas purification unit that is arranged in the exhaust passage at the downstream side of the first exhaust gas purification unit, and is equipped with a storage reduction catalyst which serves to promote a water gas shift reaction when the air fuel ratio of exhaust gas is a rich air fuel ratio which is lower than the stoichiometric air fuel ratio;
a third exhaust gas purification unit that is arranged in the exhaust passage at the downstream side of the second exhaust gas purification unit, and is equipped with a selective catalytic reduction catalyst which serves to store oxygen in exhaust gas when the air fuel ratio of the exhaust gas is a lean air fuel ratio higher than the stoichiometric air fuel ratio, and to desorb the oxygen thus stored when the air fuel ratio of the exhaust gas is equal to or lower than the stoichiometric air fuel ratio;
a first air fuel ratio sensor that measures a physical quantity correlated with an air fuel ratio of exhaust gas flowing into the first exhaust gas purification unit;
a second air fuel ratio sensor that measures a physical quantity correlated with an air fuel ratio of exhaust gas flowing into the second exhaust gas purification unit;
a third air fuel ratio sensor that measures a physical quantity correlated with an air fuel ratio of exhaust gas flowing into the third exhaust gas purification unit;
a fourth air fuel ratio sensor that measures a physical quantity correlated with an air fuel ratio of exhaust gas flowing out from the third exhaust gas purification unit; and
a controller, comprising at least one processor, configured to:
perform, when the air fuel ratio of the exhaust gas discharged from the internal combustion engine is a lean air fuel ratio, inducement processing of inducing a water gas shift reaction in each of the first exhaust gas purification unit and the second exhaust gas purification unit, by changing an air fuel ratio of exhaust gas discharged from the internal combustion engine to a rich air fuel ratio lower than the stoichiometric air fuel ratio;
obtain a total sensor output difference which is a total sum of a sensor output difference in a period while the inducement processing is performed, by integrating the sensor output difference which is a difference between a measured value of the third air fuel ratio sensor and a measured value of the fourth air fuel ratio sensor in the period, and diagnose deterioration of the third exhaust gas purification unit by using the total sensor output difference as a parameter; and
estimate, based on a deterioration degree of the three-way catalyst and a deterioration degree of the storage reduction catalyst, a first hydrogen production amount which is an amount of hydrogen produced by the first exhaust gas purification unit and a second hydrogen production amount which is an amount of hydrogen produced by the second exhaust gas purification unit while the inducement processing is performed;
wherein the controller is further configured so as to perform the inducement processing by controlling the air fuel ratio of the exhaust gas discharged from the internal combustion engine in such a manner that in cases where the first hydrogen production amount is more than the second hydrogen production amount, a measured value of the first air fuel ratio sensor becomes a first predetermined rich air fuel ratio, and in cases where the second hydrogen production amount is more than the first hydrogen production amount, a measured value of the second air fuel ratio sensor becomes a second predetermined rich air fuel ratio.

2. The deterioration diagnosis device for an exhaust gas purification apparatus as set forth in claim 1, wherein
the controller is configured to change the predetermined second rich air fuel ratio to a higher air fuel ratio when the deterioration degree of the three-way catalyst is large, in comparison with when it is small, in cases where the second hydrogen production amount is more than the first hydrogen production amount and where the air fuel ratio of the exhaust gas discharged from the internal combustion engine is controlled so that the measured value of the second air fuel ratio sensor becomes the second predetermined rich air fuel ratio.

3. The deterioration diagnosis device for an exhaust gas purification apparatus as set forth in claim 2, wherein
the controller is configured to calculate an amount of shift between the measured value of the second air fuel ratio sensor and an actual air fuel ratio at the time of performing the inducement processing, by using as parameters the deterioration degree of the three-way catalyst and the measured value of the first air fuel ratio sensor at the time of performing the inducement processing, and changes the second predetermined rich air fuel ratio in such a manner that the smaller the amount of shift, the higher the second predetermined rich air fuel ratio is made.

* * * * *